May 19, 1953 B. G. NEWHALL 2,639,126
PLATE APPARATUS AND PRESS
Filed Feb. 24, 1947 21 Sheets-Sheet 2
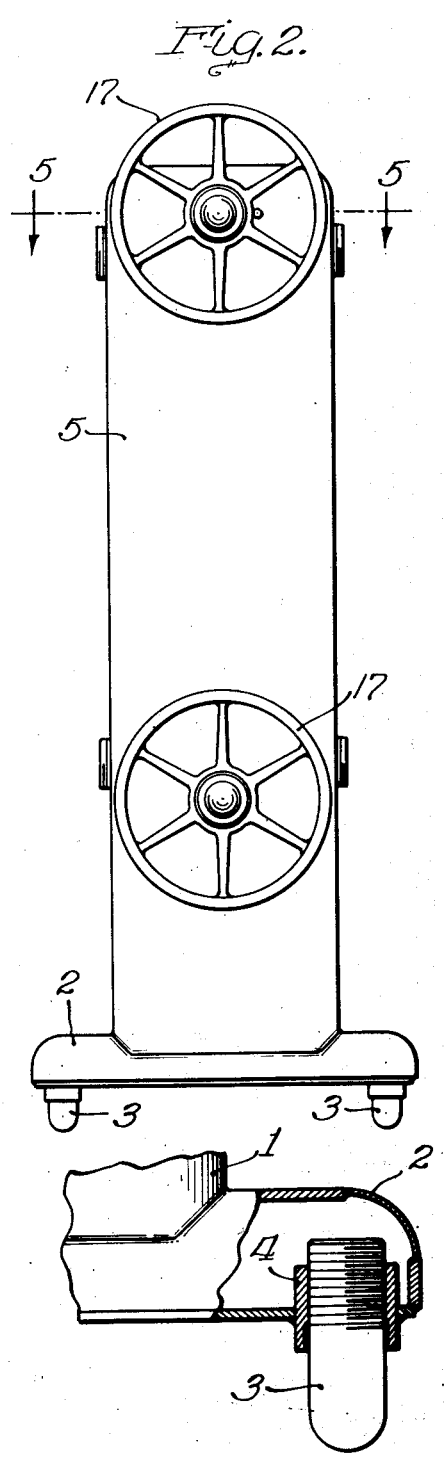
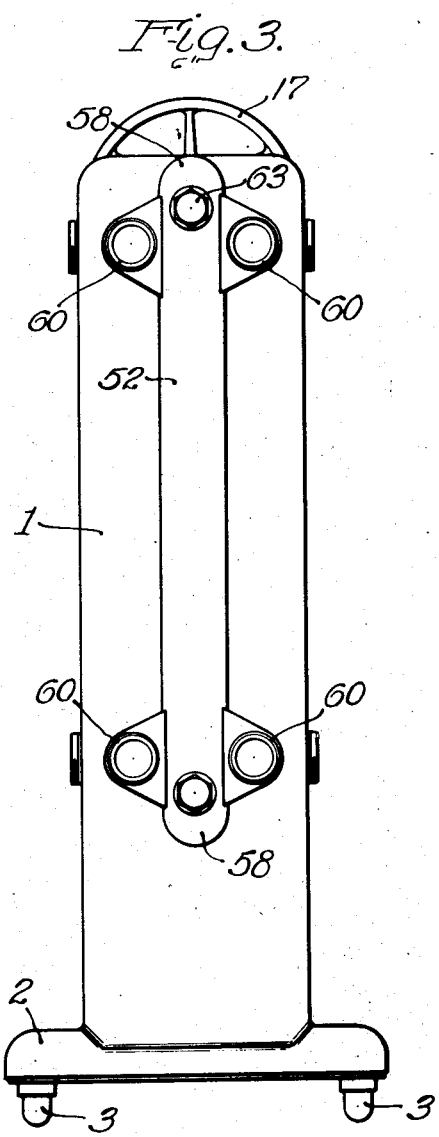
INVENTOR.
Benjamin G. Newhall
BY

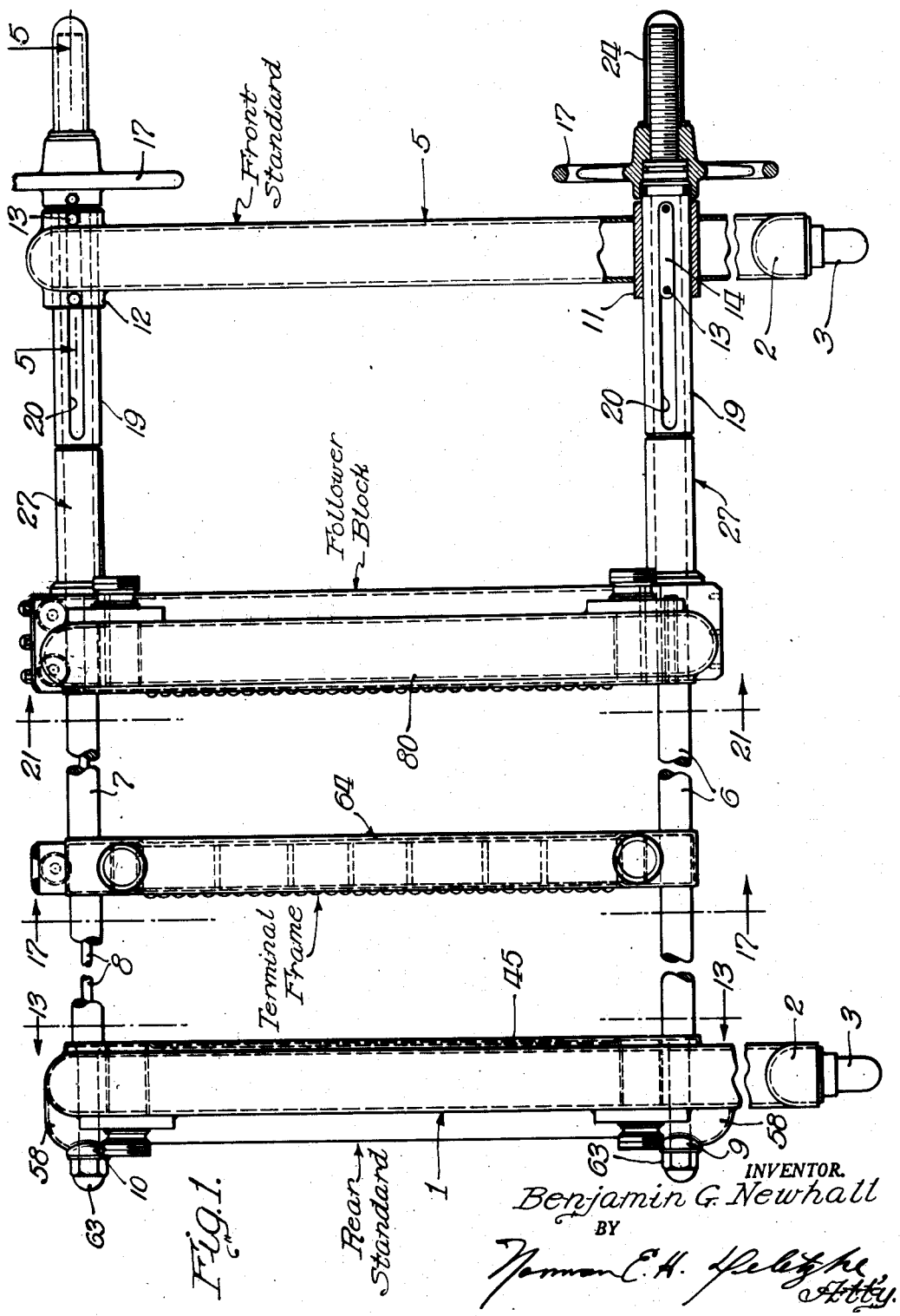

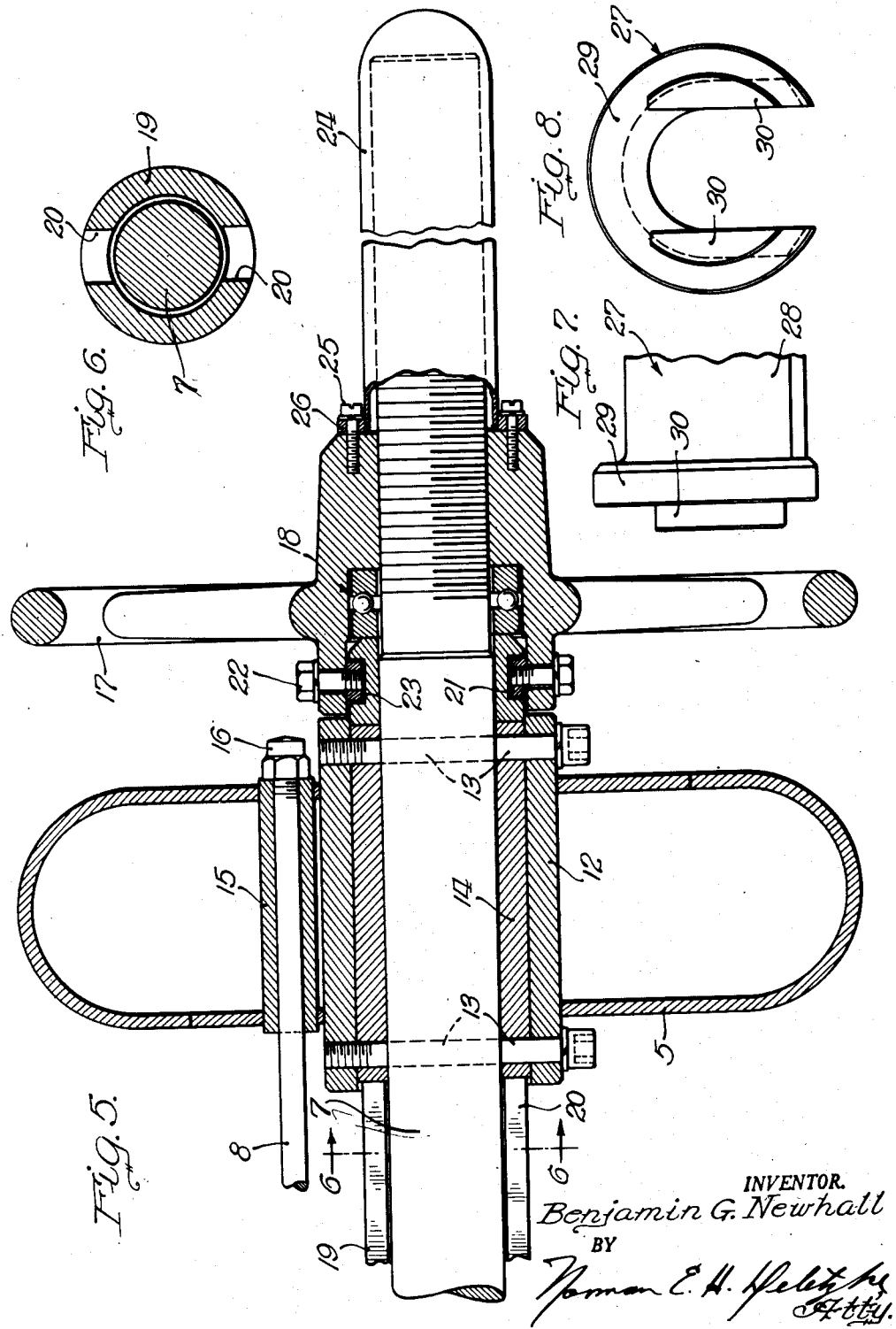

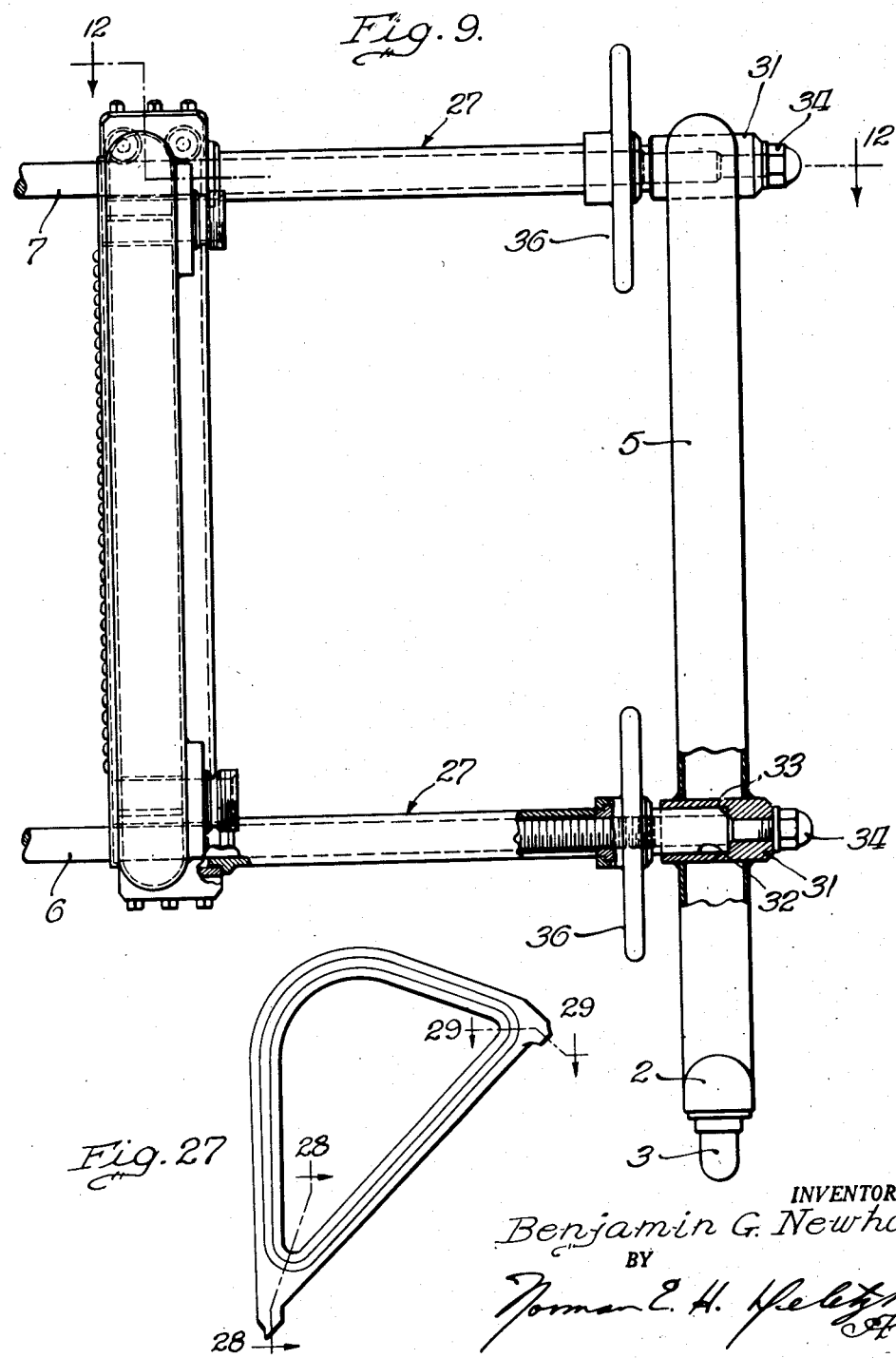

May 19, 1953     B. G. NEWHALL     2,639,126
PLATE APPARATUS AND PRESS
Filed Feb. 24, 1947                      21 Sheets-Sheet 5
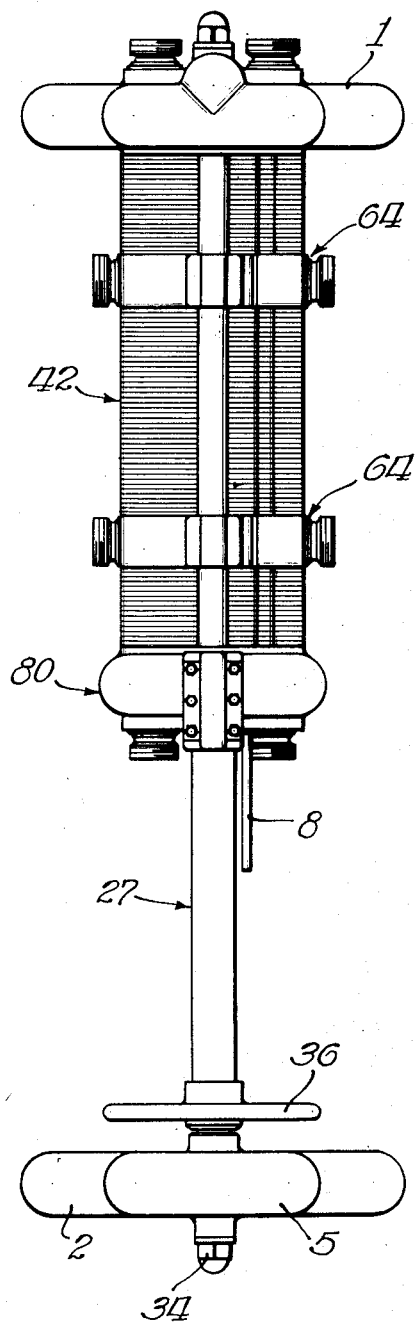
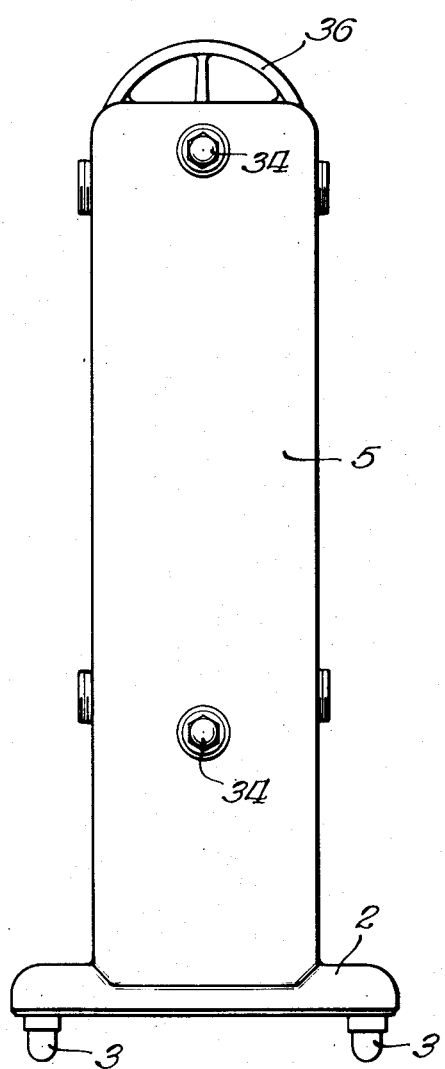
INVENTOR.
Benjamin G. Newhall
BY
Norman E. H. Heletype
Atty.

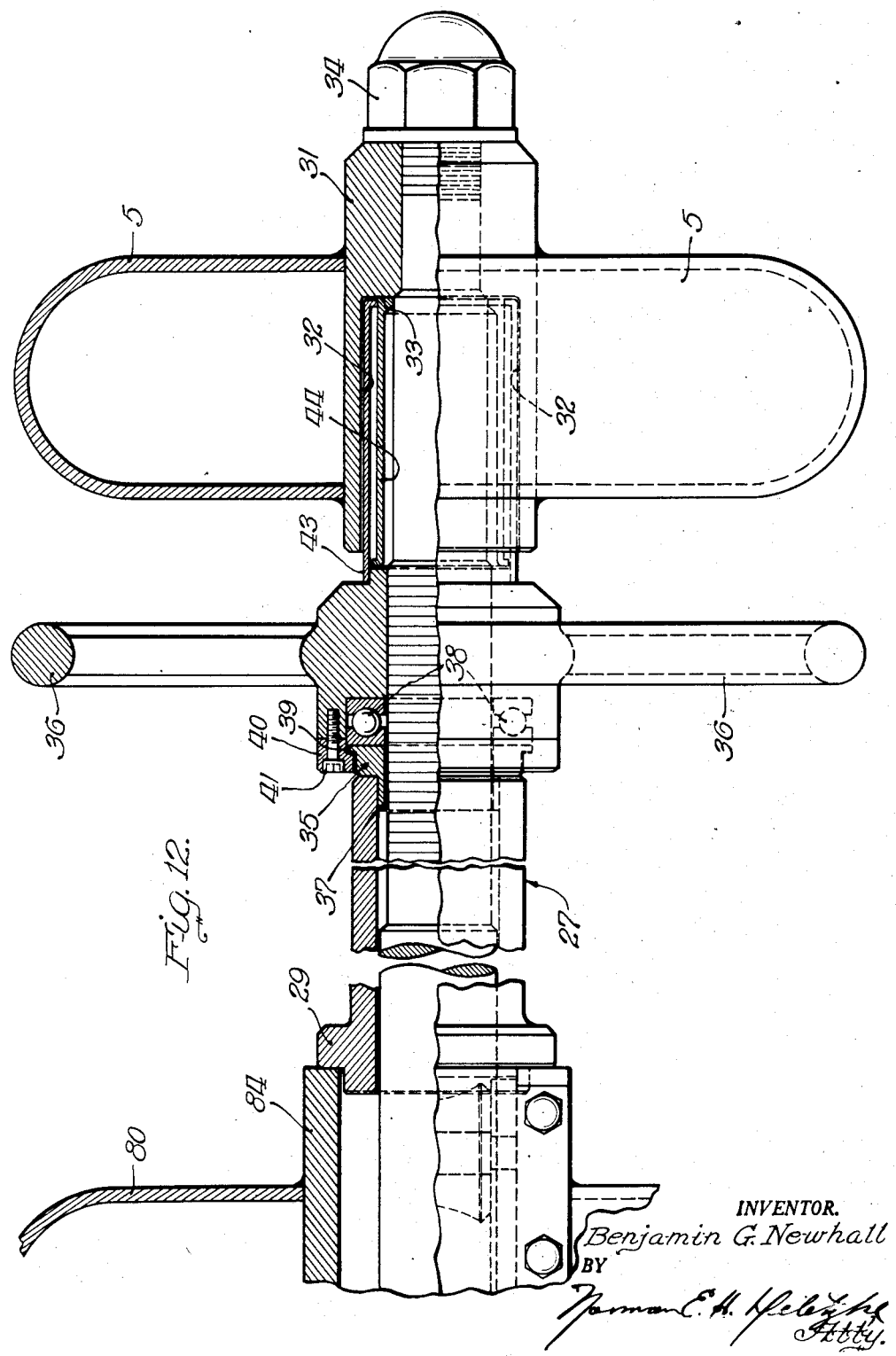

May 19, 1953  B. G. NEWHALL  2,639,126
PLATE APPARATUS AND PRESS
Filed Feb. 24, 1947  21 Sheets-Sheet 7
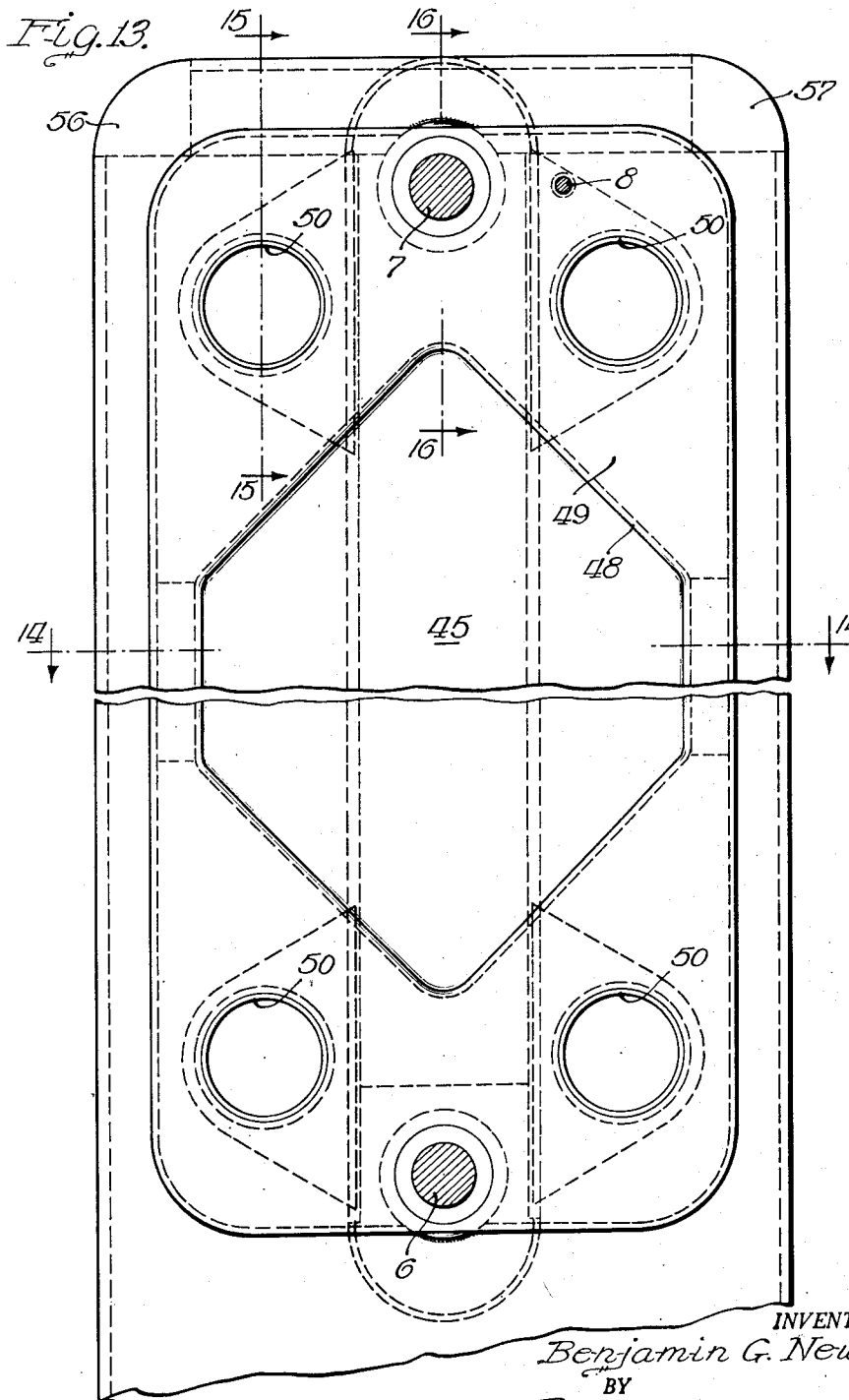
INVENTOR.
Benjamin G. Newhall
BY

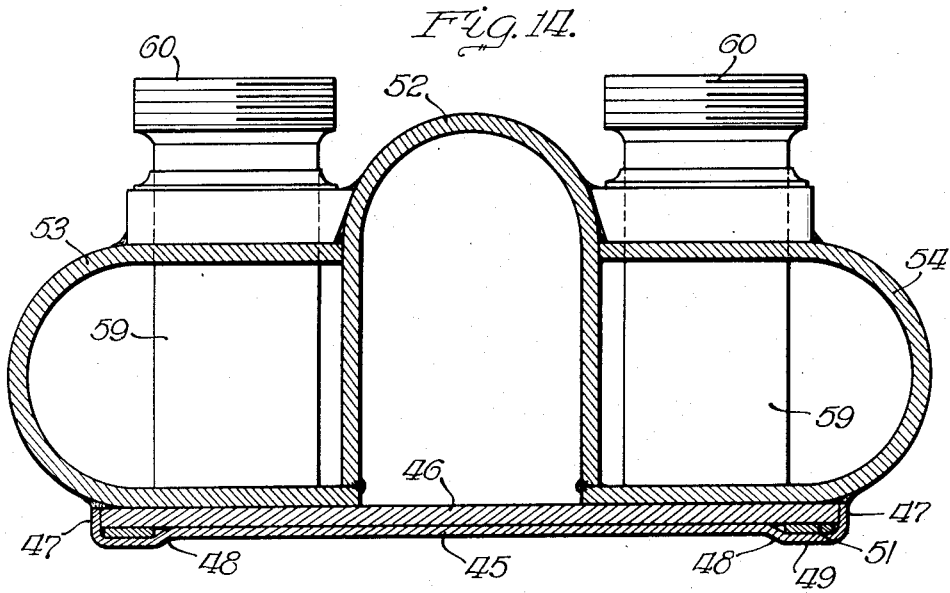
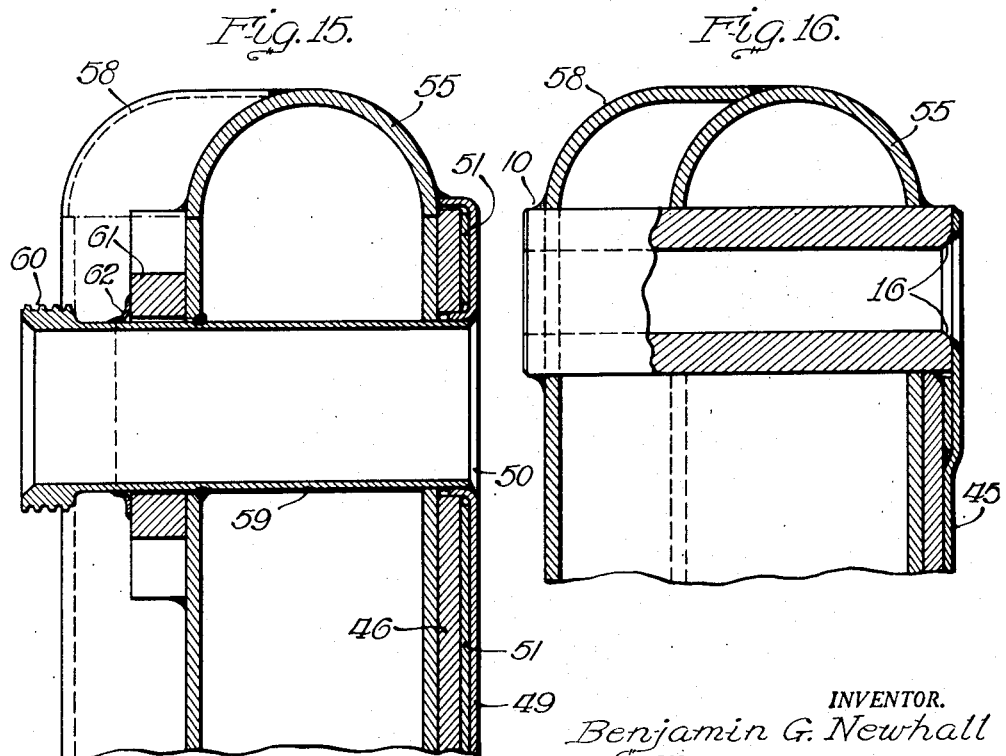

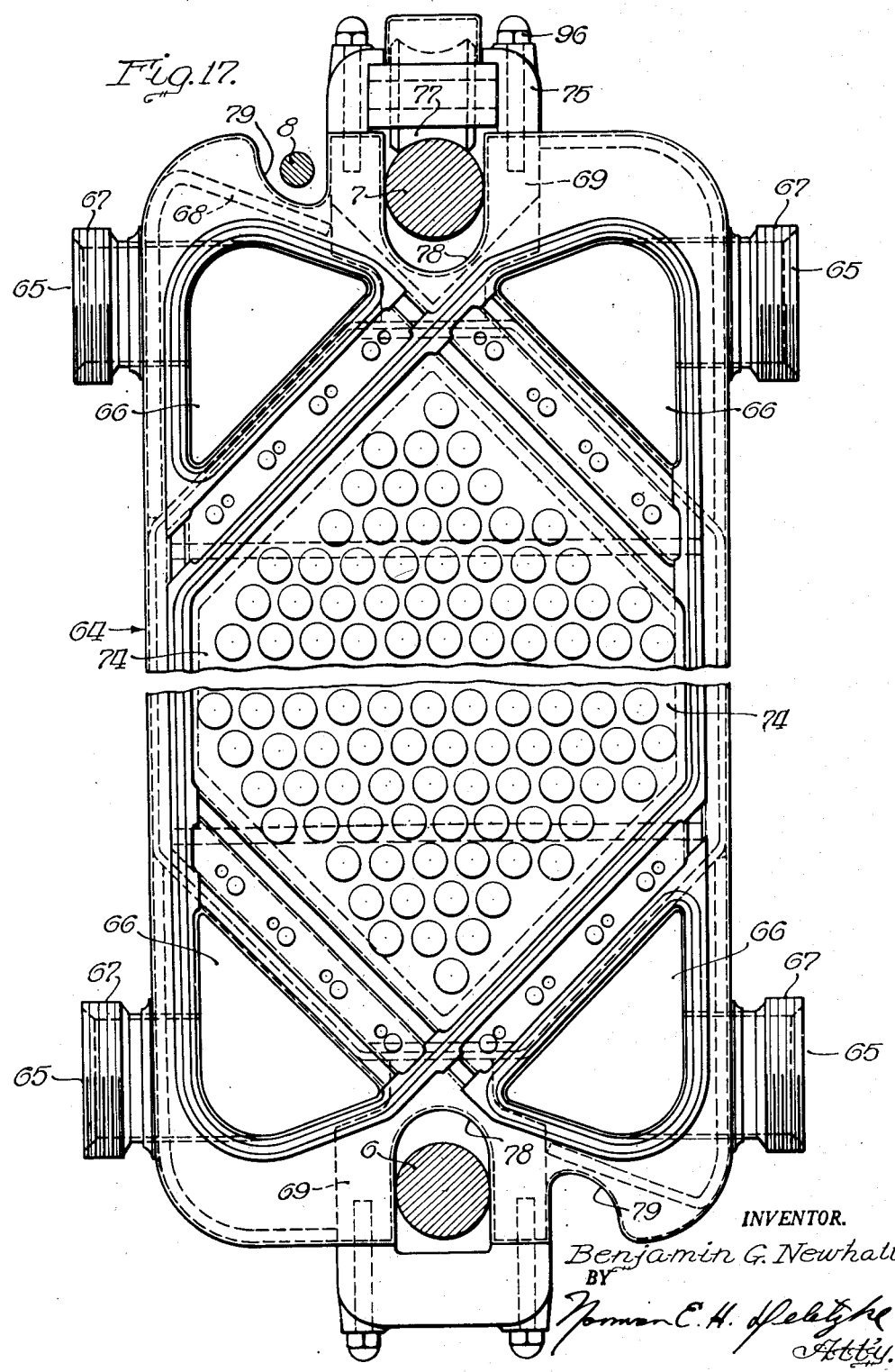

May 19, 1953  B. G. NEWHALL  2,639,126
PLATE APPARATUS AND PRESS
Filed Feb. 24, 1947  21 Sheets-Sheet 10
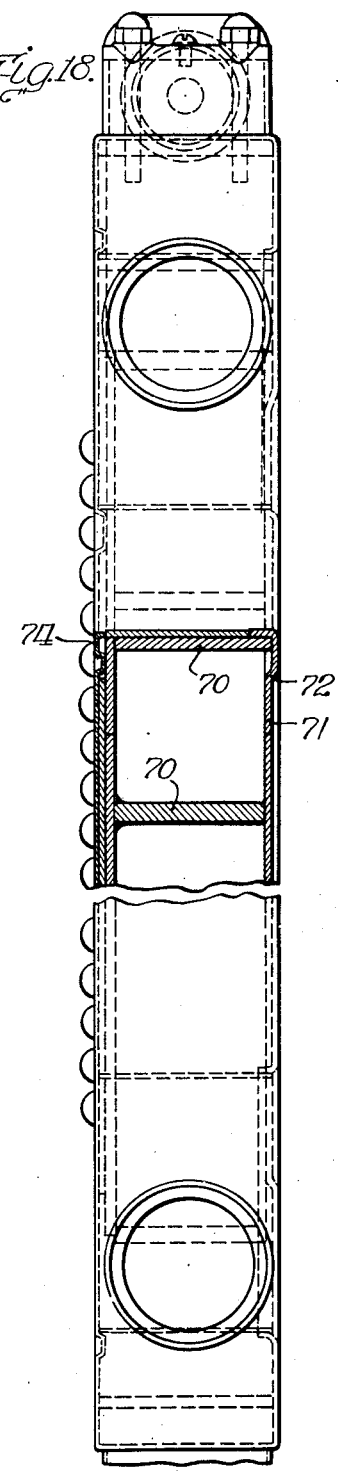
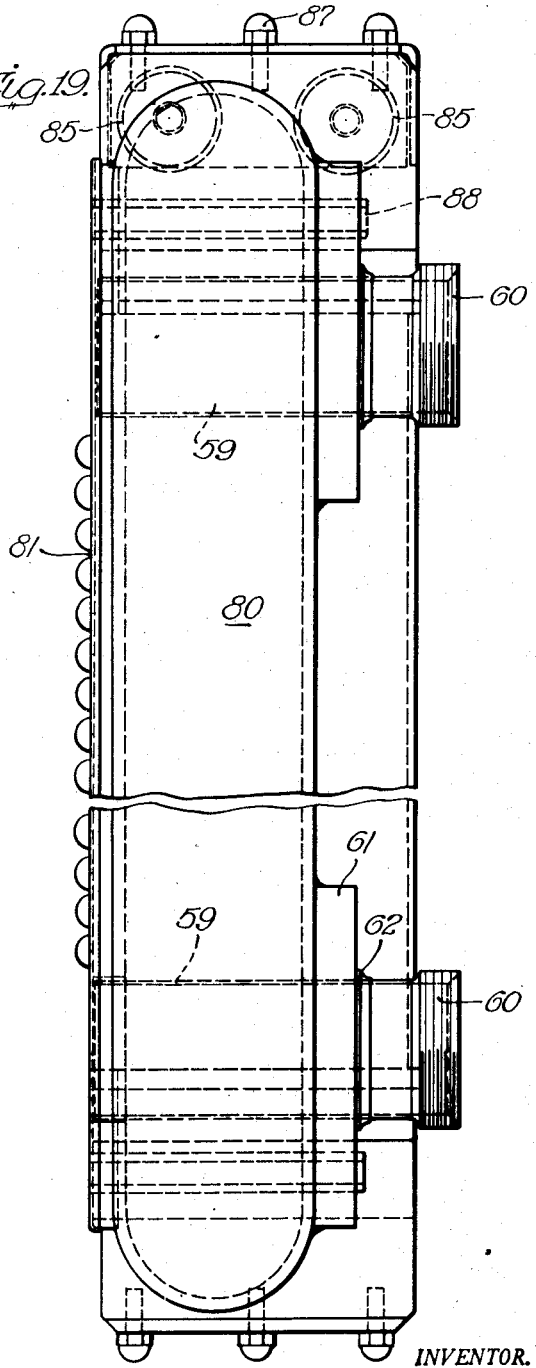
INVENTOR.
Benjamin G. Newhall
BY
Norman E. H. Deletzke
Atty.

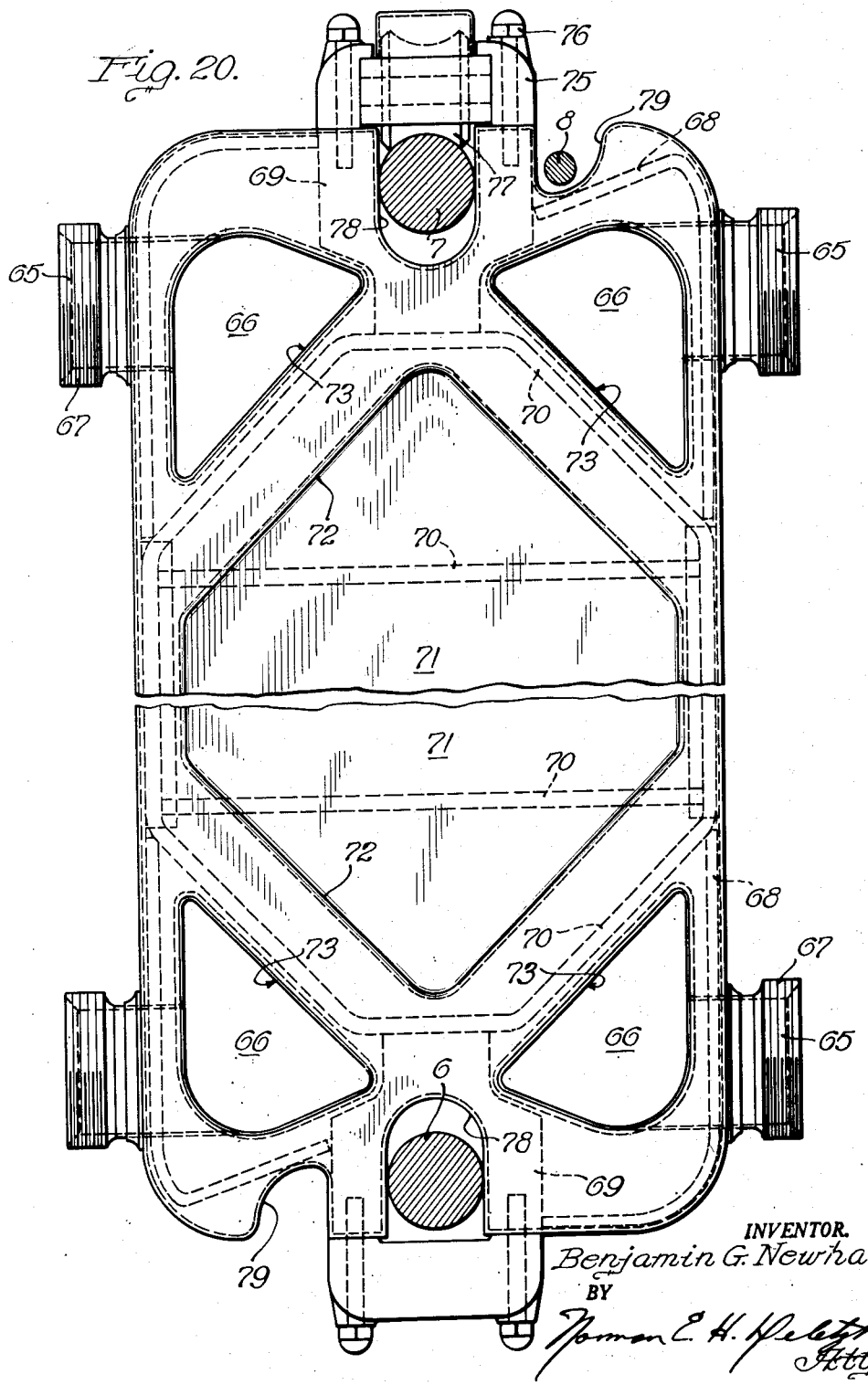

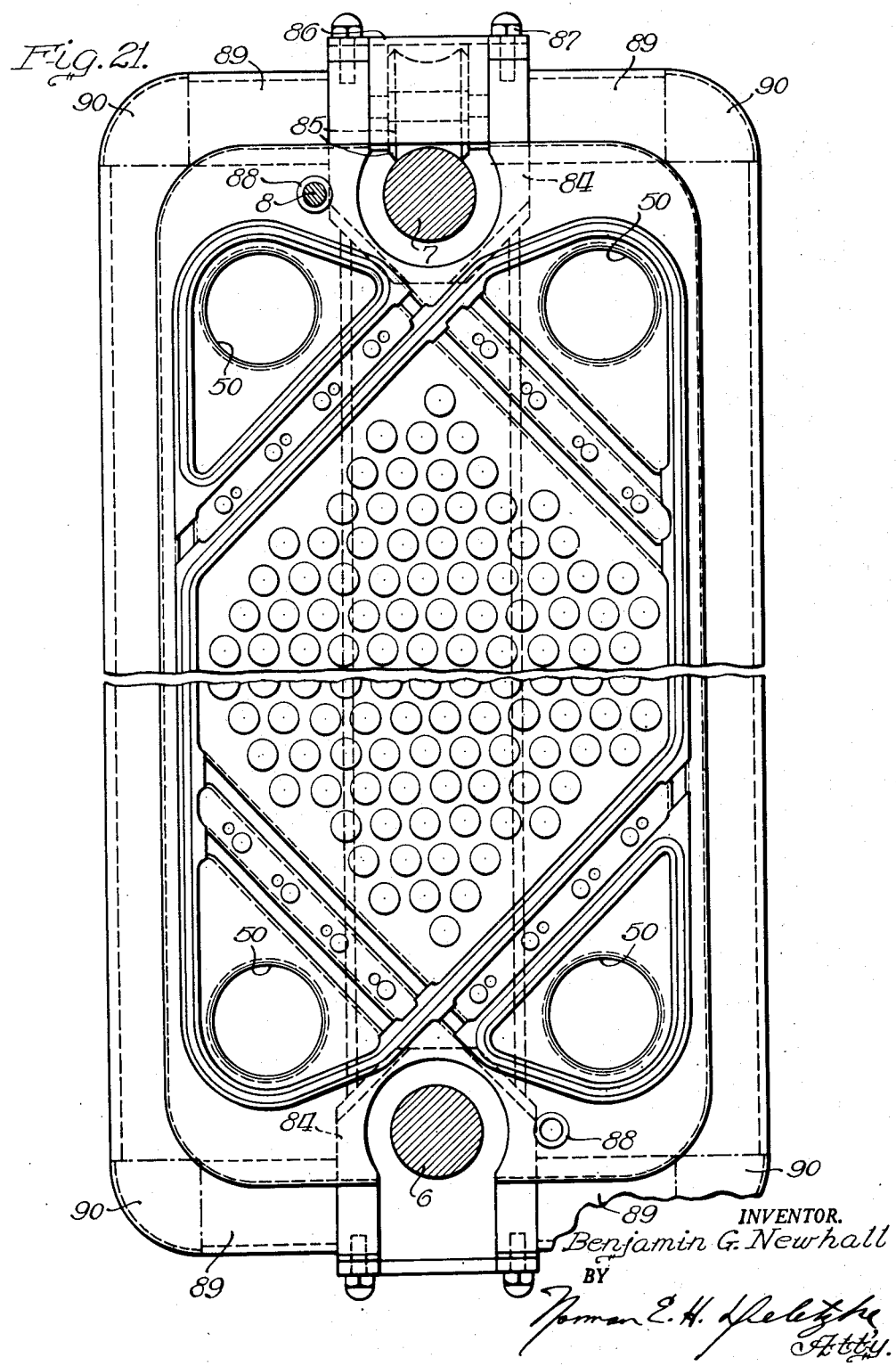

May 19, 1953 B. G. NEWHALL 2,639,126
PLATE APPARATUS AND PRESS
Filed Feb. 24, 1947 21 Sheets-Sheet 13

INVENTOR.
Benjamin G. Newhall
BY

May 19, 1953     B. G. NEWHALL     2,639,126
PLATE APPARATUS AND PRESS
Filed Feb. 24, 1947     21 Sheets-Sheet 14
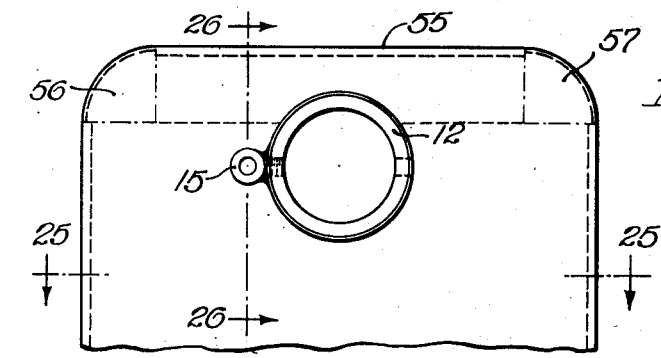
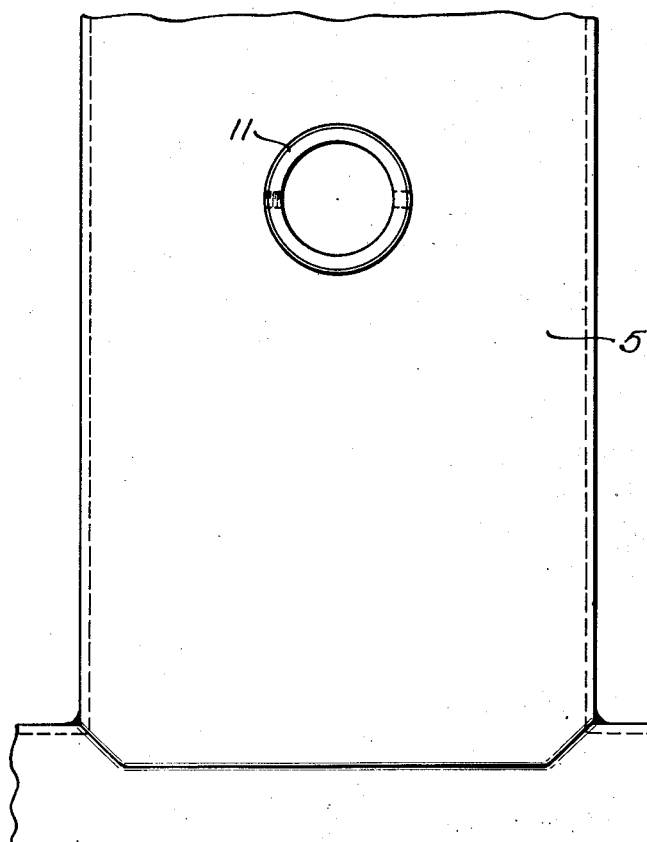
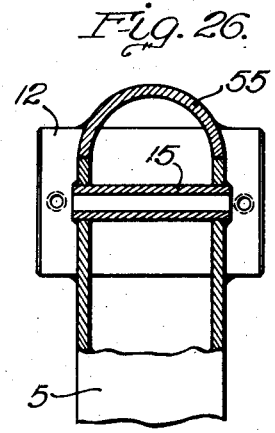
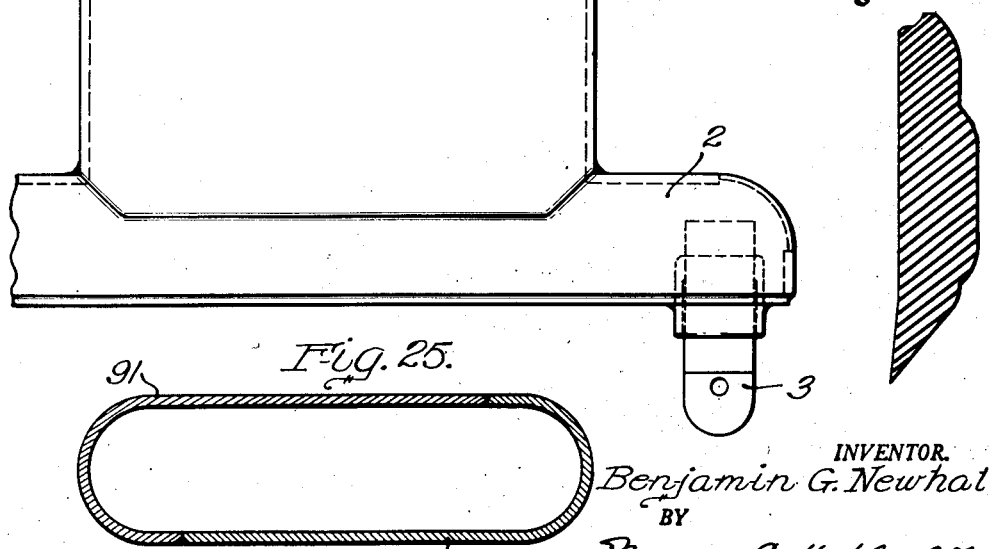
INVENTOR.
Benjamin G. Newhall
BY May 19, 1953 — B. G. NEWHALL — 2,639,126
PLATE APPARATUS AND PRESS
Filed Feb. 24, 1947 — 21 Sheets-Sheet 15
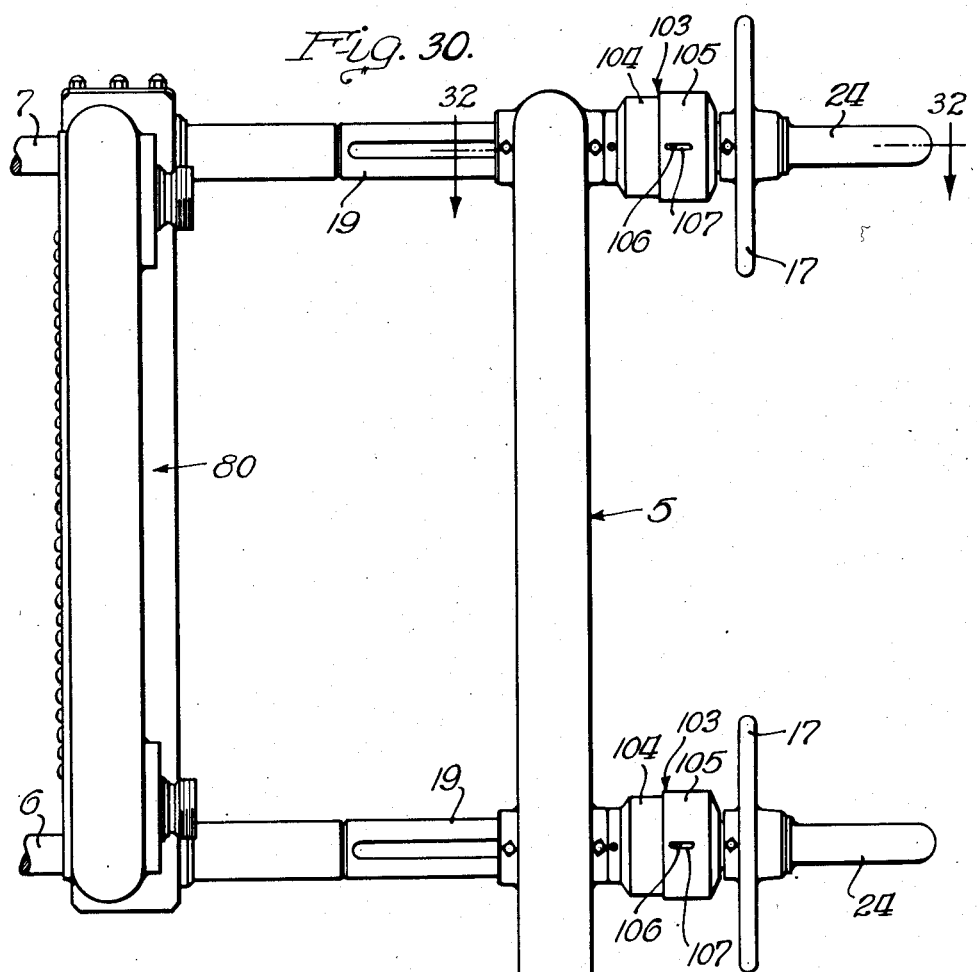
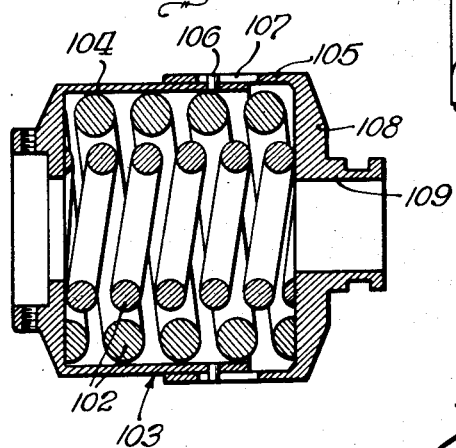
INVENTOR.
Benjamin G. Newhall

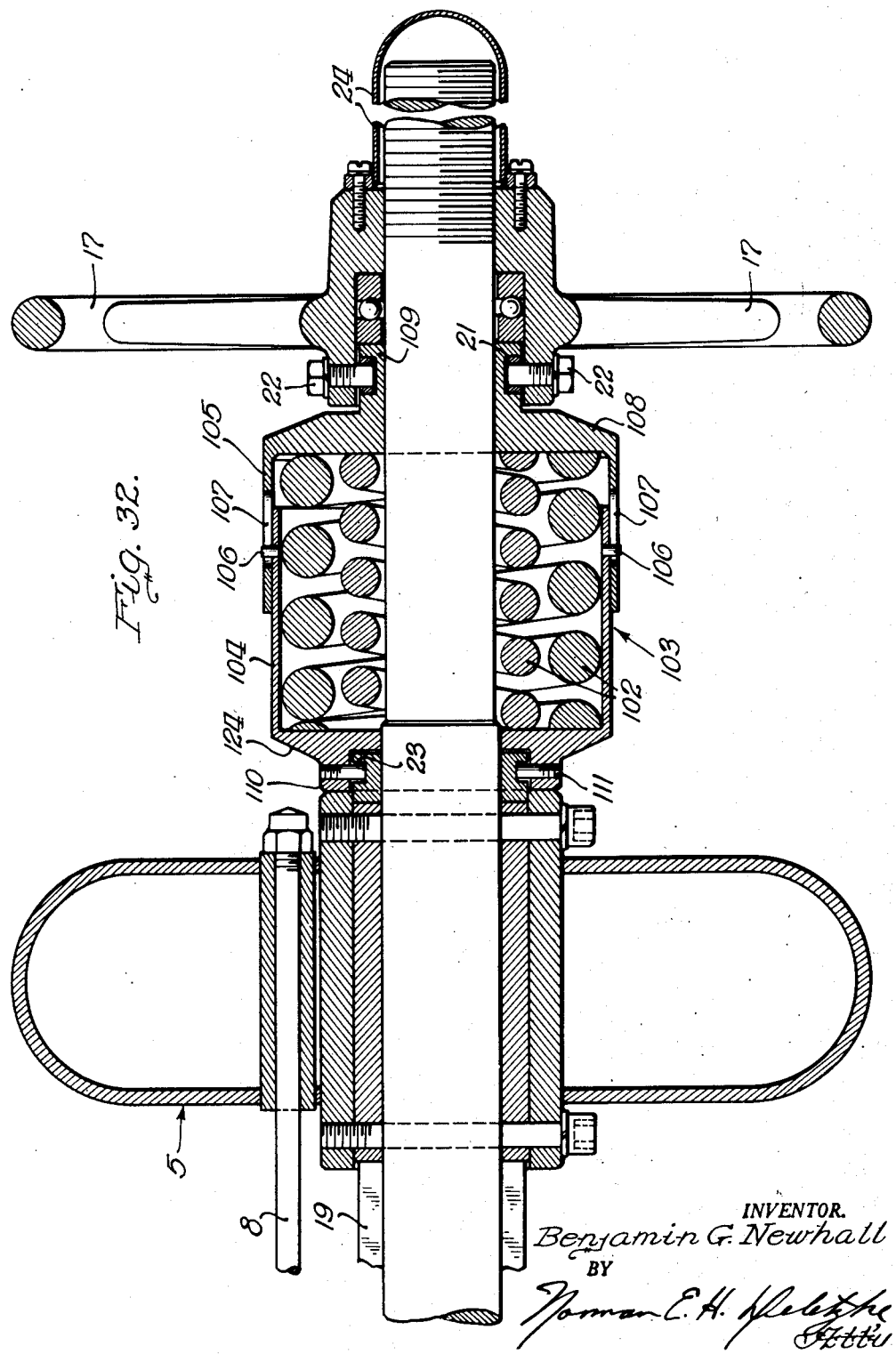

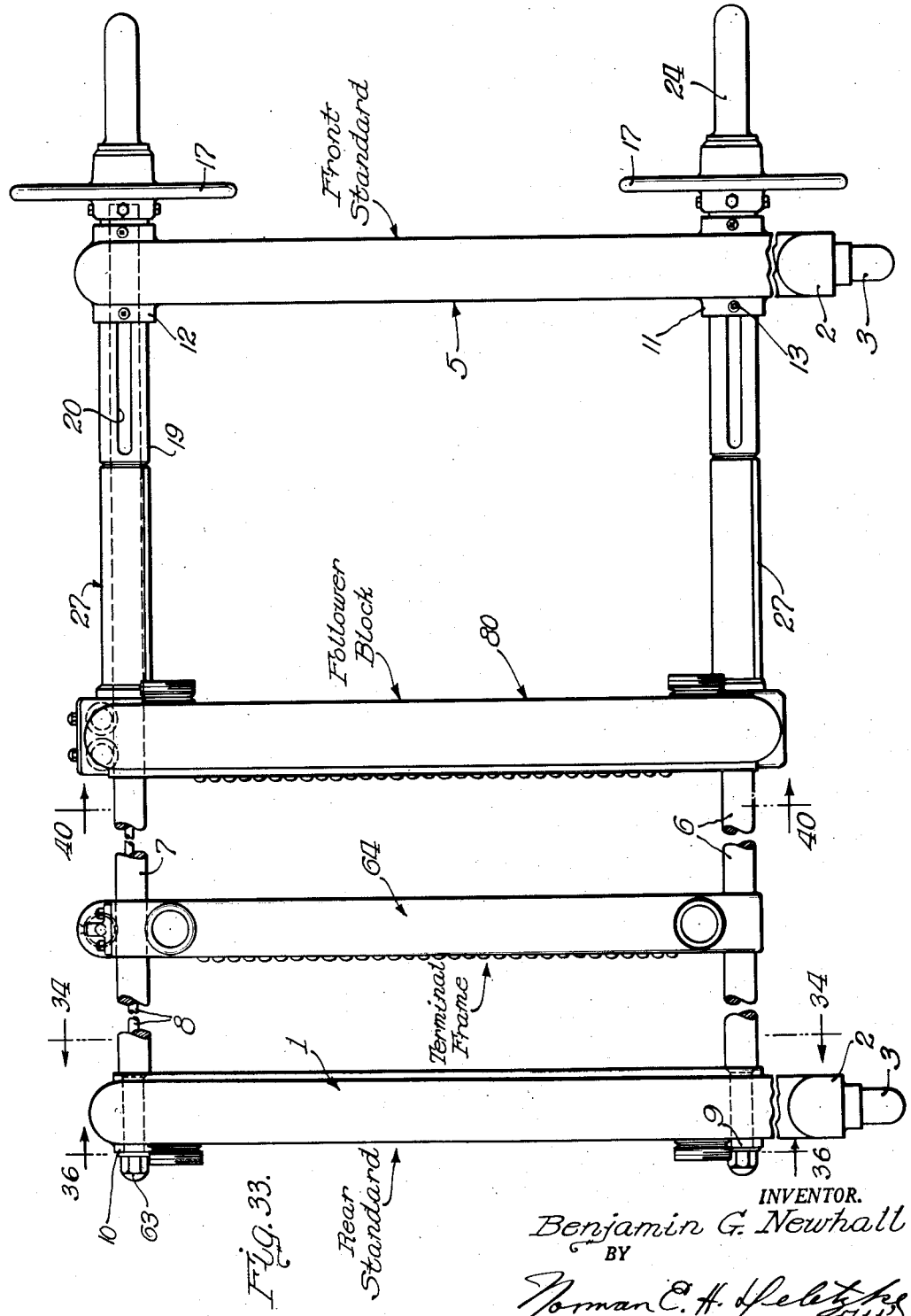

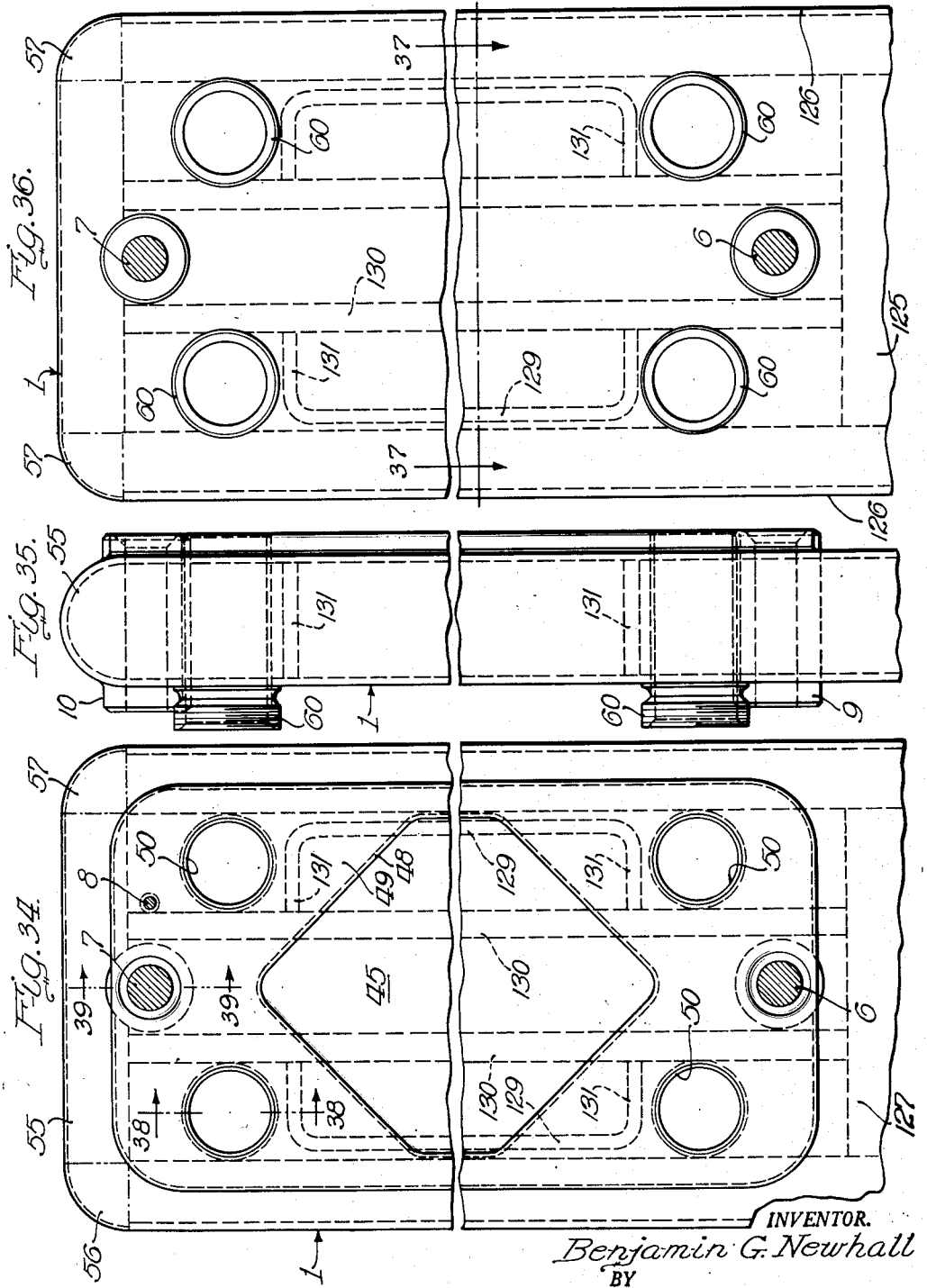

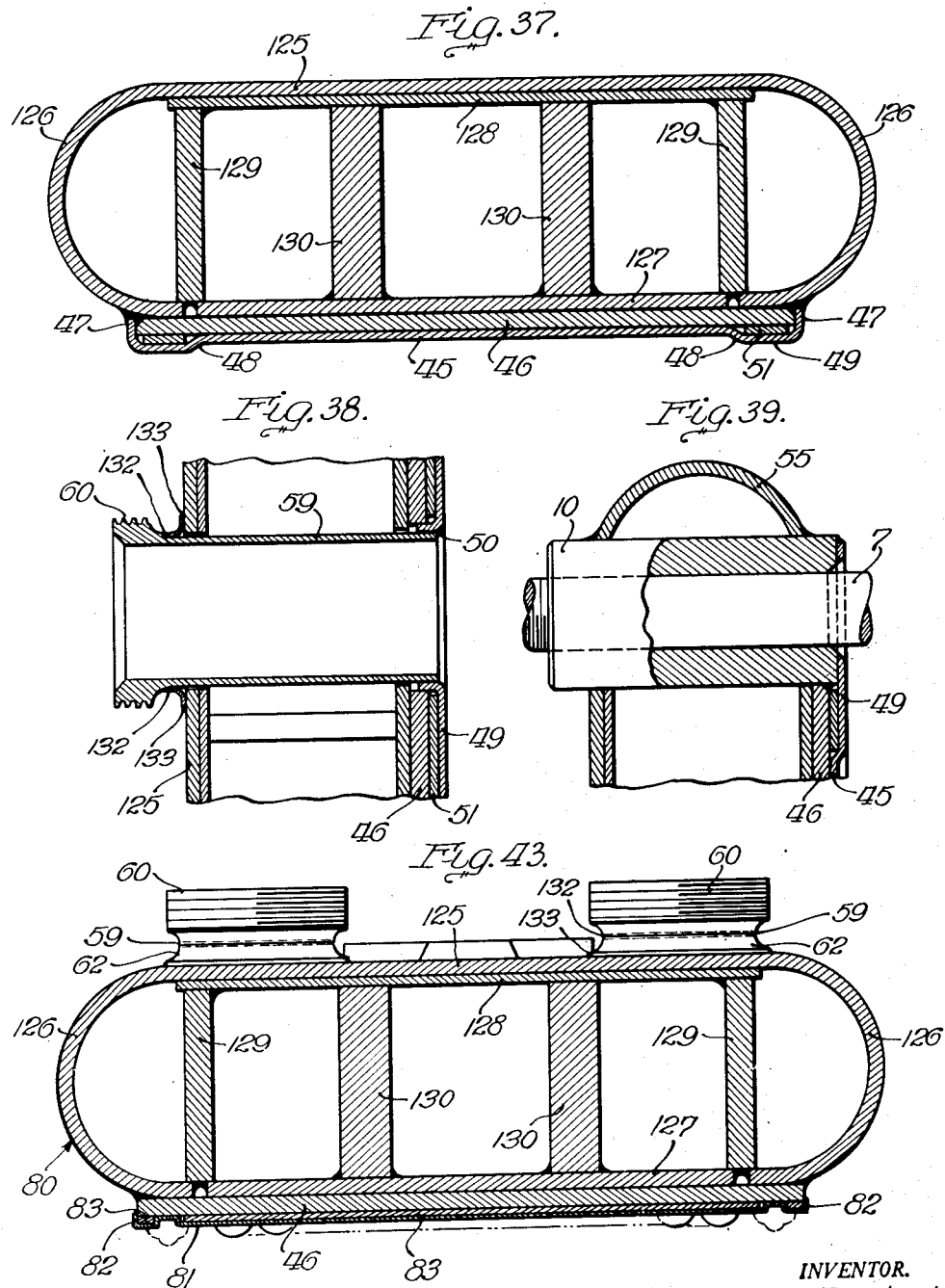

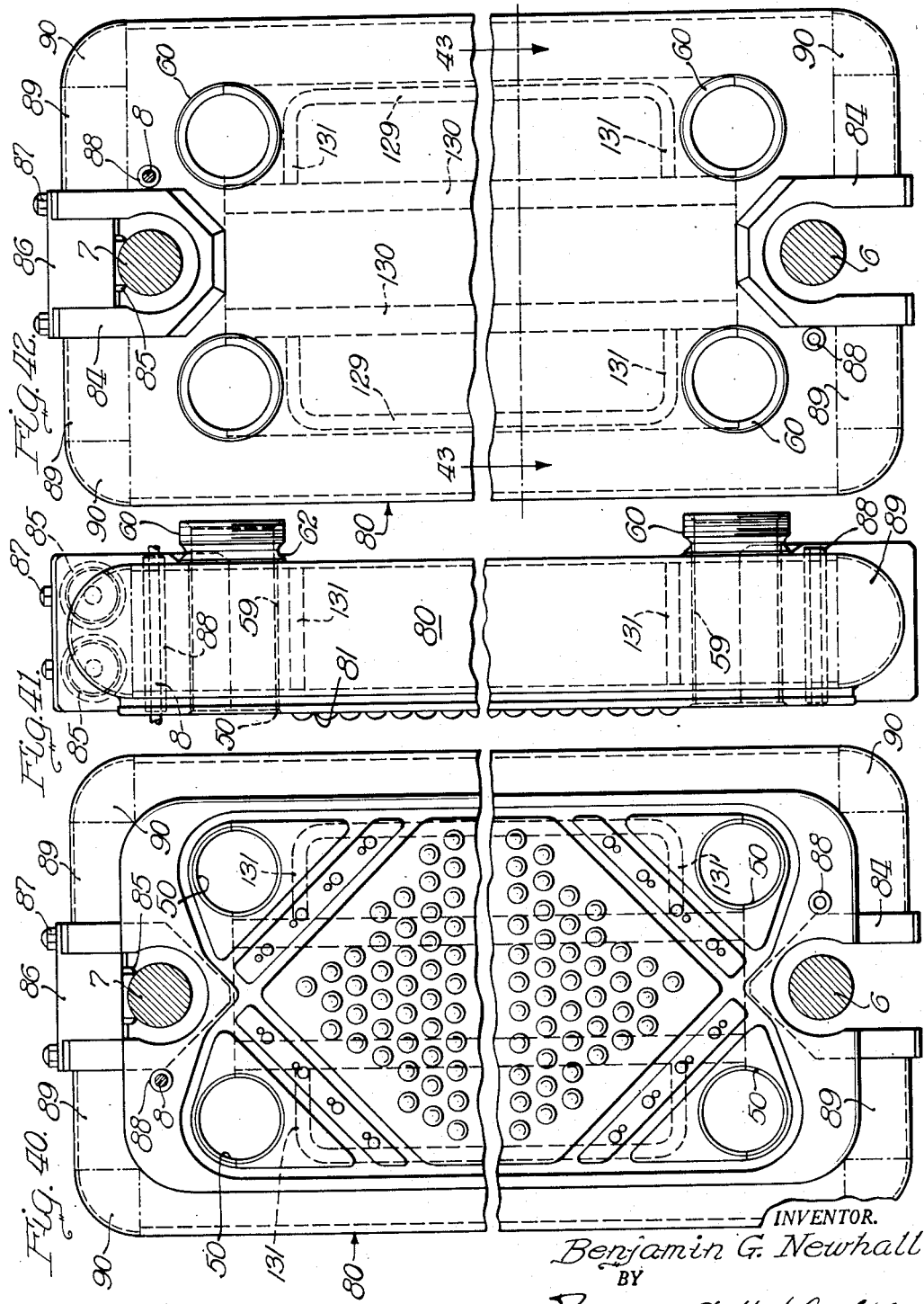

May 19, 1953  B. G. NEWHALL  2,639,126
PLATE APPARATUS AND PRESS
Filed Feb. 24, 1947  21 Sheets-Sheet 21
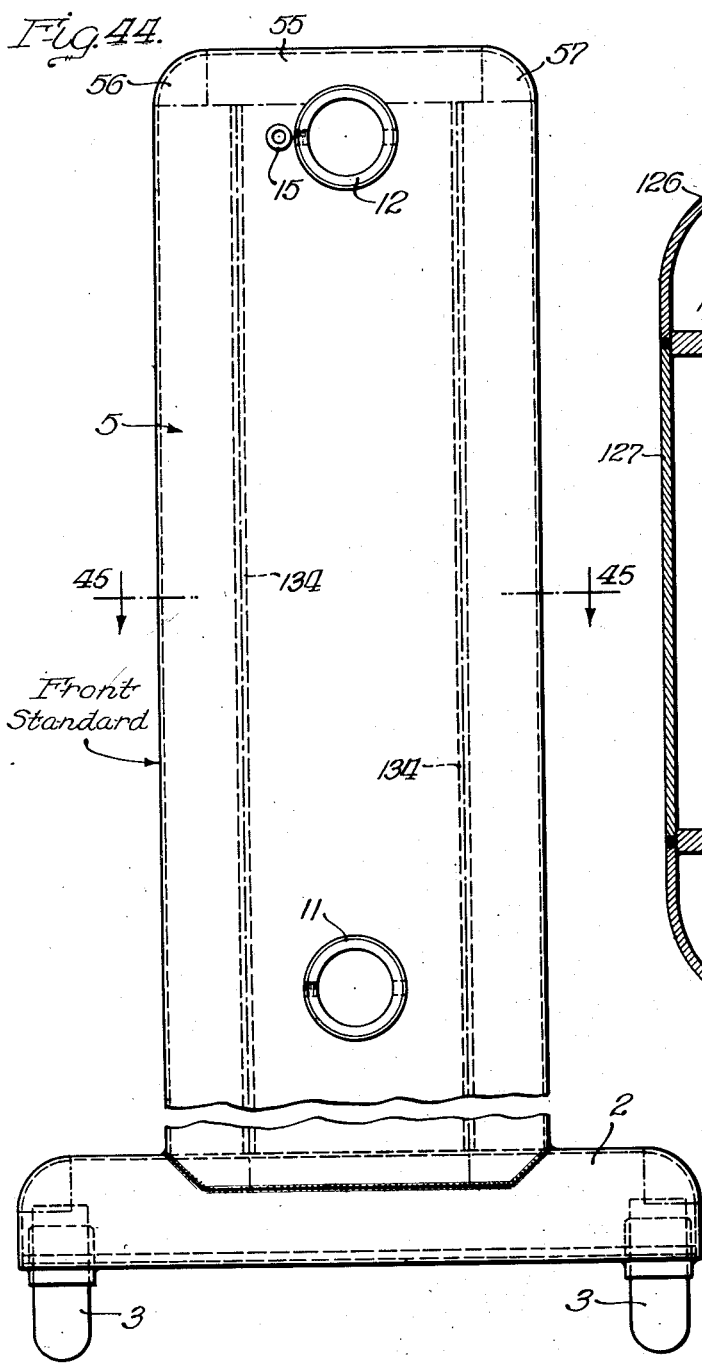
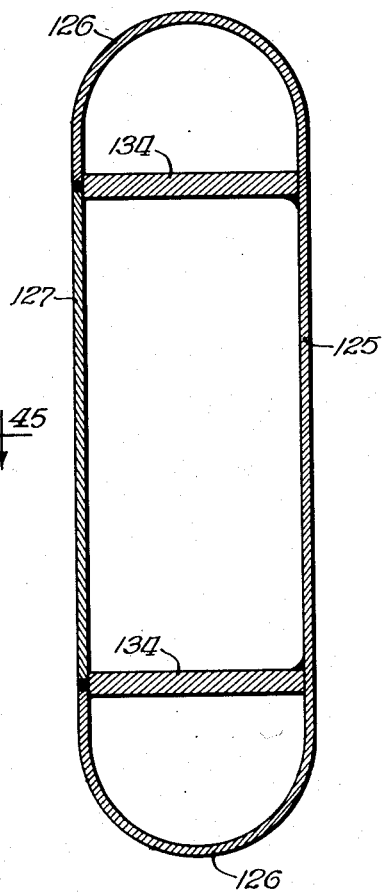
INVENTOR.
Benjamin G. Newhall
BY
Norman E. H. ...
Atty.

Patented May 19, 1953

2,639,126

UNITED STATES PATENT OFFICE 2,639,126

PLATE APPARATUS AND PRESS

Benjamin G. Newhall, Little Falls, N. Y., assignor to Cherry-Burrell Corporation, Wilmington, Del., a corporation Application February 24, 1947, Serial No. 730,639

13 Claims. (Cl. 257—245)

This invention pertains to improvements in apparatus, such, for example, as plate type heat exchangers, filter presses, or similar assemblage of elements, in which a plurality of plate-like units or plate-like elements and spacers, or frame-like elements and compression elements are operatively supported upon a framework or in a press in close side-by-side position.

More particularly, this invention relates to the novel improvements in the arrangement and structure of the supporting framework, the releasable plate-like elements, the spacing elements, containing means for establishing fluid conduit connections, the compression element, and the compressing unit, whereby there are provided devices of great strength anad sanitary construction, possessing great flexibility of assembly and disassembly, and flexibility of arrangement for operation under a large variety of operating conditions.

The aspect of my invention directed to an improvement in a plate for a plate type heat exchanger is disclosed and claimed in my co-pending divisional application entitled "Plate for Heat Exchange Apparatus," Serial No. 6,769, filed February 6, 1948.

The aspect of my invention directed to improvements in a gasket are disclosed and claimed in my divisional co-pending application entitled "Gasket for Heat Exchange Plate, Serial No. 6,770, filed February 6, 1948.

This invention is particularly well adapted for use in connection with a plate type of milk processing machine. The preferred embodiment of this invention, without, however, being limited thereto, will therefore be described in connection with the adaptation thereof in a sanitarily designed plate type of heat exchanger of the class or type commonly used in dairies for the heat treatment of milk or other like dairy or food products. Possible arrangement of ports and plates to secure the desired liquid flow system in the applicant's type of plate heat exchanger is clearly illustrated aand described in the Feldmeier Patent No. 2,039,216, and the Wildermuth Patent No. 2,392,021.

It is common knowledge that great care must be exercised in the handling or processing of milk and like perishable products, and it has been observed that the use of stainless types of metals, such as the more common types of stainless steel, lend themselves very well for use in the handling or processing of milk and the like. The chemical composition of milk and many other like food products or beverages make it desirable in the present-day type of processing that the product be handled or processed in apparatus in which it will come in contact only with non-reactive surfaces.

In devices used for the pasteurization of milk or like food products, sanitary design, as well as a design which permits ready disassembly and assembly to expedite cleaning and inspection, is of the utmost importance. The present invention contemplates a sanitary design and the mechanical arrangement of the co-acting parts of the illustrated plate type apparatus whereby all of the elements which come in contact with the product being processed may be quickly and easily made accessible for frequent inspection and cleaning with relative ease of assembly and disassembly of the apparatus.

In a device such as the plate type of heat exchange apparatus or filter press or the like, in which numerous coacting gasketed plates, spacer and communication elements, are used, it is important that in the assembled unit the various complementary portions of the elements are automatically aligned into operative position and thus retained with a minimum of effort.

This invention, therefore, has for its primary objects the provision of improvements in a plate type of heat exchanger; in which the plate-like elements when in operative position are primarily supported upon one element of a supporting framework and are stabilized by another element of the supporting framework; in which the plate-like elements may be disengaged from the primary support and stabilizing portions of the framework and pivotally supported for inspection and cleaning upon a third element of the framework; in which the spacing elements intermediate the plates and compression element, as well as the compression element, are primarily supported upon the element of the supporting framework which stabilizes the plates and are in turn stabilized upon the element of the supporting framework upon which the plates are supported; in which each of the plates is provided at each end with a centrally positioned primary support engaging element and a laterally positioned secondary support engaging element to enable the inversion of the plates upon the supporting framework; in which all of the surface which comes in contact with the product being processed has a neutral or substantially neutral reaction to the product being processed; in which all portions of the assemblage including the intervening gaskets on the plate-like elements may be uniformly compressed; in which the surfaces of the supporting framework and the spacing elements and the compression element adjacent to the plate-like elements of the assemblage are used to form fluid film flow spaces with the adjacent plate-like elements; in which the standards of the supporting framework and the spacing elements and the compression element are fabricated from sheet metal; in which the compression mechanism is so designed as to enable the ready assembly and disassembly of the apparatus, as well as to permit appreciable variation in the quantity of plates assembled in the press; and in which there is provided an improved plate and plate gasket for plate type heat exchangers of the type contemplated by this invention.

Other objects and advantages of the present invention will be apparent upon a consideration of the following description when read in connection with the accompanying drawings, in which:

Figure 1 is a side elevational view, partially in broken-away section, of the improved framework, spacing and compression elements for the improved plate type of heat exchanger.

Figure 2 is a right-hand end elevation of the apparatus illustrated in Figure 1 of the drawings.

Figure 3 is a left-hand elevation of the rear standard illustrated in Figure 1 of the drawings.

Figure 4 is a side elevational view, partially in broken-away section of a portion of the base for an end standard or upright of the assembled framework illustrated in Figure 1 of the drawings.

Figure 5 is a view taken along line 5—5 of each of the Figures 1 and 2 of the drawings.

Figure 6 is taken along line 6—6 of Figure 5 of the drawings.

Figure 7 is a side elevation of the left-hand end portion of a sectional compressive thrust transfer element interposed between the compression or hand grip wheels and the compressive element or follower block, as illustrated in Figure 1 of the drawings.

Figure 8 is an end elevation of the left-hand end of the element illustrated in part in Figure 7 of the drawings.

Figure 9 is a side elevation of the right-hand end portion of a modified framework of the general type illustrated in Figure 1 of the drawings, and in which the compression or hand grip wheels are mounted upon the supporting rods inside of the right-hand or front upright or standard of the framework.

Figure 10 is a plan view of the improved heat exchanger embodying the present invention, and in which the compression wheels are mounted inside of the front upright or standard in the manner illustrated in Figure 9 of the drawings.

Figure 11 is a front end elevation of the device illustrated in Figure 10 of the drawings.

Figure 12 is a view taken along line 12—12 of Figure 9 of the drawings.

Figure 13 is a view taken along line 13—13 of Figure 1 of the drawings, and illustrates the inner plate contacting surface of the rear or left-hand upright or standard of the framework illustrated in Figure 1 of the drawings.

Figure 14 is a view taken along line 14—14 of Figure 13 of the drawings.

Figure 15 is a view taken along line 15—15 of Figure 13 of the drawings.

Figure 16 is a view taken along line 16—16 of Figure 13 of the drawings.

Figure 17 is a view of the terminal frame taken along line 17—17 of Figure 1 of the drawings, and illustrates the left-hand side of the terminal frame shown in Figure 1 of the drawings.

Figure 18 is a right-hand elevational view, partially in broken-away section, of the terminal frame illustrated in Figure 17 of the drawings.

Figure 19 is a partial side elevation of the compression element or follower block illustrated in Figure 1 of the drawings.

Figure 20 is an elevational view of the right-hand side of the terminal frame or spacing element as viewed in Figure 1 of the drawings, and as illustrated in Figure 17 of the drawings.

Figure 21 is a view of the compression element or follower block, taken along line 21—21 of Figure 1 of the drawings, and illustrates the left-hand of the compression element shown in Figure 1 of the drawings.

Figure 24 is a partial, elevational view of the left-hand side of the front upright or standard, illustrated in Figure 1 of the drawings.

Figure 25 is a view taken along the line 25—25 of Figure 24 of the drawings.

Figure 26 is a view taken along line 26—26 of Figure 24 of the drawings.

Figure 27 is a plan view of a section of a gasket adapted for use on the heat exchanger.

Figure 28 is a sectional view taken along the line 28—28 of Figure 27 of the drawings.

Figure 29 is a sectional view taken along the line 29—29 of Figure 27 of the drawings.

Figure 30 is a side elevation of the right-hand portion of the supporting framework of the type illustrated in Figure 1 of the drawings, equipped with enclosed compression modulating springs intermediate the hand wheels or grips and the sectional thrust transfer elements.

Figure 31 is a horizontal sectional view, taken through the enclosed compression modulating springs of Figure 30 of the drawings.

Figure 32 is a sectional view taken along the line 32—32 of Figure 30 of the drawings.

Figure 33 is a side elevational view, partially in broken-away section, of a modification of the type of framework shown in Figure 1 of the drawings.

Figure 34 is an elevational view taken along line 34—34 of Figure 33 of the drawings.

Figure 35 is an elevational view of the left-hand side of the standard shown in Figure 34 of the drawings.

Figure 36 is an elevational view taken along line 36—36 of Figure 33 of the drawings.

Figure 37 is a sectional view taken along line 37—37 of Figure 36 of the drawings.

Figure 38 is a sectional view taken along line 38—38 of Figure 34 of the drawings.

Figure 39 is a sectional view taken along line 39—39 of Figure 34 of the drawings.

Figure 40 is an elevational view taken along line 40—40 of Figure 33 of the drawings.

Figure 41 is an illustrative partial side elevational view of the modified compression element or follower block shown in Figure 33 of the drawings.

Figure 42 is a partial elevational view of the right-hand side of the modified follower block shown in Figure 41 of the drawings.

Figure 43 is a sectional view taken along line 43—43 of Figure 42 of the drawings.

Figure 44 is a partial elevational view of the left-hand side of a modified front upright or standard, as shown in Figure 33 of the drawings.

Figure 45 is a sectional view taken along line 45—45 of Figure 44 of the drawings.

Figure 22:
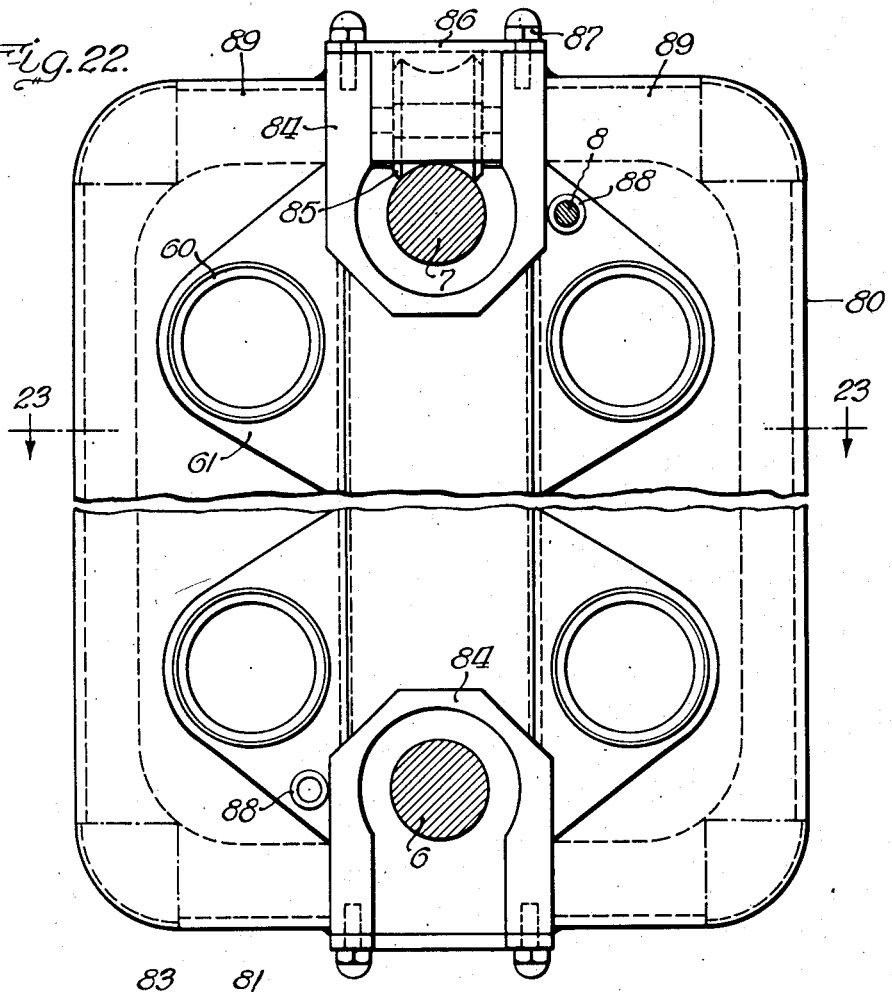
Figure 22 is a partial, elevational view of the right-hand side of the follower block or compression element illustrated in Figure 1 of the drawings.

Referring to the drawings, in which like numerals are used to identify like elements, 1 represents generally the rear upright or standard or fixed compression block or element of the supporting framework for the plate type of heat exchanger. The upright or compression block 1 is provided with a base element 2, having two supporting studs 3, adjustably secured as by screw threads to a threaded collar 4, fixed in the base 2, as illustrated in Figure 4 of the drawings. The front upright or standard 5, likeunto the rear upright or standard 1, is also provided with a base 2 and the adjustable studs or feet 3. The front standard 5, however, is not provided with the compression face plate for engaging adjacent plate-like elements as is provided in the rear standard 1 and which will hereinafter be more fully described. The uprights 1 and 5 are joined by the parallel, horizontally disposed, lower and upper primary and secondary support rods 6 and 7, respectively. Rod 7 is positioned directly above rod 6. An auxiliary support rod 8 for pivotally supporting or stabilizing plate-like elements is also provided intermediate the uprights 1 and 5. Each of the rods 6 and 7 extend through apertures in suitable bearing-like elements 9 and 10 in the rear standard 1.

The bearing-like elements 9 and 10 are each provided with countersunk shoulders 10a for engaging complementary shoulders on the rods 6 and 7, as clearly illustrated in Figures 1 and 16 of the drawings. The rod 8 is secured to the rear standard 1 in any suitable manner, such, for example, as by threading into a suitable tapped opening in the standard 1.

At the forward end of the supporting framework, the rods 6 and 7 extend through suitable bearing-like or sleeve guiding elements 11 and 12, respectively, in the front standard 5, and are secured to sleeves or bearings 11 and 12 by any suitable arrangement, such, for example, as the bolts 13, which pass through the shafts 6 and 7, the spacing and guide bars 14, and bearings 11 and 12. Each of the bolts 13 is anchored to the bearings or sleeves 11 and 12 by any suitable means, such as the conventional threading arrangement, as clearly illustrated in Figures 1 and 5 of the drawings. The rods 6 and 7, however, do not come in contact with the bearings or sleeve guides 11 and 12, but are spaced therefrom by the combined guide and spacing bars 14, one of which is positioned on each side of each of the rods 6 and 7. By the use of the aforementioned arrangement, the rear and front uprights or standards 1 and 5, together with the rods 6 and 7, form a rigid framework upon which to support the plate-like elements, terminal or spacer frames and follower or compression block, which are used in assembling the complete operative plate type of heat exchanger. As also clearly illustrated in Figure 5 of the drawings, the auxiliary support rod 8 is anchored to the front upright 5 by the extension thereof through a suitable bearing-like element 15. The nut 16 threaded to the outer forward end of the rod 8 and abutting against the end of the bearing 14 is adjusted to supply tension to the rod 8 and securely hold the rod 8 in the supporting framework.

Each of the rods 6 and 7 in the preferred embodiment of the invention is appropriately threaded at its forward end beyond the upright 5 for receiving a handwheel 17. The inwardly extending threads in the hub of the wheels 17 engage the complementary threads on the rods 6 and 7. Upon the appropriate rotation of the wheels 17 they advance upon the rods 6 and 7 toward the forward standard 5. As clearly indicated in Figure 5 of the drawings, each of the wheels 17 is provided on the interior of the hub with a suitable ball-type thrust bearing 18, properly seated in a complementary recess interiorly of the hub. The bearings 18 are each adapted to engage the forward and complementary ends of the compression or thrust tubes 19, which are telescoped over the shafts 6 and 7 and extend through the bearing or guide-like elements or sleeves 11 and 12 and are provided with diametrically opposite slots 20 to receive in sliding contact the spacing and guide bars 14. The forward ends of the compression tubes 19 extend into the hubs of the wheels 17 into engagement with the thrust bearings 18.

Upon the clockwise rotation of the wheels 17, as viewed in Figure 2 of the drawings, the forward end of the compression or thrust tubes 19 will be compressively engaged by the bearings 18 and moved from right to left through the bearing-like elements 11 and 12. The possible rotation of the tubes 19 with the handwheels 17 is prevented by the engagement of the walls of the slot 20 with the complementary edges of the guide bars 14.

To enable the retraction of the tubes 19 upon the counter-clockwise rotation of the wheels 17, the hubs of each of the wheels 17 is provided with an inwardly extending, sectional retaining element 21 secured to the hubs by suitable means, such as screws 22. The elements 21 extend into the groove 23 in the outer peripheral portion of the forward end of the compression tubes 19. Upon the counter-clockwise rotation of the wheels 17, the right-hand shoulder or edge of the associated flange or retainer 21 engages the adjacent shoulder or edge of the groove 23, thereby to retract the element 19 from left to right, as viewed in Figure 1 of the drawings, through the bearing-like elements 11 and 12.

A cap-like element 24 is provided over the extreme, outwardly extending portion of the rods 6 and 7. Each of the cap-like elements is secured to the outer face of the associated wheel 17 by any suitable means, as, for example, the overlapping flange 26 and the screws 25 for securing the flange 26 to the hub of the wheel 17. The caps 24 are of such proportion as to permit the ready movement of the wheels 17 to the extreme inward position which may be desired in the application of compression by means of thrust transfer elements and a compression element to the plate mechanism supported within the supporting framework which consists primarily of the standards 1 and 5 and the rods 6 and 7.

At the inner ends of each of the compression or thrust tubes or elements 19, there is provided a compression or thrust yoke or element, generally identified by the numeral 27, as clearly illustrated in an assembled operative position in Figure 1 of the drawings. The compression or thrust yoke 27 is illustrated in more detail in Figures 7 and 8 of the drawings. The yoke-like elements 27, which are provided on each of the rods 6 and 7, consist of a tubular body portion 28, provided at its left or inward end with the outwardly extending flange 29. A portion of the tube 28, extending throughout the entire length thereof and along the lower side thereof, and a comparable portion of the flange 29 has been removed to enable the ready assembly and disassembly of the yokes 27 upon the support rods 6 and 7 with the open side of the yokes directed downwardly. A portion of the tube 28 and the flange 29, which has been removed, is of a width slightly in excess of the diameter of the rods 6 and 7. The inner diameter of the yoke element 27 is slightly in excess of the diameter of the rods 6 and 7. The end of each of the elements 27, formed by the end of the tube 28 and the flush surface of the associated flange 29, is provided with opposed studs 30, stationed diametrically opposite to one another. When the elements 27 are assembled in operative position in the heat exchanger, the studs 30 are positioned in a horizontal plane, and in each instance parallel to a plane including the axis of the associated rod 6 or 7. The outer surface of the studs 30 are circular and concentric with the opposed arcs of the circle having a diameter slightly greater than the outer diameter of the tube-like portion 28 of the yoke element 27. The flat inner faces of the studs 30, when in operative position, are arranged vertically and perpendicular to a horizontal plane passing through the associated rods 6 or 7. When in operative position, as clearly shown in Figure 1 of the drawings, the yoke elements 27 are mounted on the rods 6 and 7 with the unflanged ends thereof in engagement with the complementary and adjacent ends of the thrust tubes 19. The associated tubes 19 and yokes 27, when assembled upon the rods 6 and 7 in the manner described, provide means for the transfer of the inward compressive thrust or motion of the wheels 17 and constitute an arrangement whereby the elements of the assemblage mounted upon the rods 6 and 7, intermediate the uprights 1 and 5, may be compressed.

The inward end of the compression yokes or elements 27 engage the adjacent surfaces of the follower blocks or compression elements in a manner hereinafter to be described more in detail.

A variation of the afore-described arrangement of the compressive thrust transfer tubes and yokes 19 and 27 and the compression applying handwheels 17 is illustrated in Figures 9 to 12, inclusive, of the drawings. This variation contemplates that the forward upright or standard 5 is located or positioned at and rigidly secured to the extreme forward end of the support rods 6 and 7. In this variant of the invention, the upright 5 is provided with hub-like rod-engaging elements 31. The elements 31 are each provided with a central aperture 32, having an offset shoulder 33 at about the mid-portion of the element 31. The offset shoulders 33 are adapted in each instance to engage the complementary shoulders on the associated rods 6 and 7. The extreme forward ends of the rods 6 and 7 are each threaded and are of a reduced diameter to fit closely into and extend through the reduced diameter portion of the associated apertures 32 in the associated element 31. The threaded portion of the rods 6 and 7, which extend through the forward face of the elements 31 are each, in turn, provided with a suitable nut 34, which, when tightened, securely locks the rods 6 and 7 to the forward upright or standard 5.

As clearly illustrated in Figures 9 and 12 of the drawings, each of the rods 6 and 7 is provided with a long compression or thrust yoke 27, differing in structure from the compression yoke 27 illustrated in Figures 7 and 8 of the drawings primarily in the length of the slotted tube-like portion 28. The forward end of the compression yoke 27, as illustrated in Figures 9 to 12 of the drawings, and as intended for use in the therein illustrated variant of the invention, is telescoped over and engages a centering and modified compression or thrust tube, generally identified by the numeral 35. The compression or thrust 35, in each instance, is carried by the inner face of the hub of the associated handwheel 36. The handwheels 36, which are mounted on the rods 6 and 7 in the presently described variant of the invention, are each provided with apertured hubs. Screw threads are provided in the forward portion of these apertured hubs, and when in operative position the screw threads are in engagement with complementary screw threads on the outer periphery of the associated rods 6 and 7 immediately inwardly of the front upright 5. To provide a suitable covering for the exposed portion of the screw threads on the rods 6 and 7, when the handwheels 36 have been moved inwardly of the standard 5, telescoping cover elements 43 and 44 are provided intermediate the inner face of the front upright or standard 5 and the adjacent faces of the inwardly disposed handwheels 36. The telescoping elements 43 and 44 are provided with complementary and inter-cooperating flanges and are so secured to the hub of the handwheels 36 as to bring about the extension and compression of the telescoped elements 43 and 44 upon the forward or rearward motion of the handwheels 36 upon the rods 6 and 7. One of the flanges is so constructed as to engage a shoulder on the associated rod 6 or 7 and limit the forward motion of one of the telescoped covering members.

The centering and compression tubes 35 are each provided with an annular portion 37 extending into the adjacent end of the compression yoke 27. The wall of the annulus 37 is of a thickness suitable for centering the adjacent end of the yoke 27 upon the rods 6 or 7. The element 35 consists primarily of a ring-like body portion, closely fitted on the rods 6 or 7 in the inner face of the associated wheel 36. The thrust and centering element 35 is provided with opposed flat faces perpendicular to the axis of the associated hub of the wheel 36. The opposed flat faces are adapted to engage the adjacent end of the yoke 27 and the adjacent surface of the ball type compression bearing 38, which bearing is also housed in the hub of the associated handwheel 36. The main body or ring portion of the element 35 is provided with the outwardly extending, annular rib 39, which is overlapped by suitable ring-like retainer flange 40 secured to the hub of the associated wheel 36 by any suitable means, such as screws 41. By this arrangement, the element 35 serves as a retainer for the bearing 38 and is also caused to move axially but not rotate with the hub of the wheel 36 during the motion of the wheel 36 back and forth upon the associated rods 6 or 7 incidental to compression or decompression rotation thereof.

In the preceding portion of the description of this invention, there has been set forth, among other things, two variants of an arrangement for mounting the compressive thrust generating handwheels 17 and 36 upon the supporting framework of the improved type of heat exchanger.

As illustrated in Figures 1 and 10, the present invention contemplates a plate type of heat exchanger, in which a plurality of gasketed and apertured plates 42 are mounted in close side-by-side juxtaposition upon the rods 6 and 7, together with suitable terminal or spacing elements or frames 64 and follower blocks or compression elements 80, also provided with gasketed fluid flow passages, all arranged in such order as to establish the appropriate flow passages intermediate the plates 42 for the heat exchange medium and milk or other liquid to be heated, regenerative heat exchange flow between the unheated and heated liquid being processed, and the heat exchange between the processed liquid and the cooling medium. The plates 42 and terminal or spacing frames or elements 64 and compression element 80 and the associated resilient gaskets are compressed between the rear upright 1 and the front upright or standard 5 by the use of the compression element or follower block 80, which is urged toward the rear upright or standard 1 by the thrust tubes and yokes 19 and 27 when the handwheels 17 or 36 are appropriately rotated.

The rear upright or standard 1 differs from the front upright or standard 5, particularly by the inclusion in the rear standard 1 of suitable means for withstanding the pressure incident to the compression of the plates 42 in the associated resilient gaskets, and by the inclusion of a suitable face plate for the engagement of the adjacent plate 42, which face plate must also be suitable for contacting of the product being processed, as well as by the inclusion of suitable fluid connections, whereby fluids flowing in heat exchange through the improved apparatus may be introduced or withdrawn from the fluid flow spaces formed intermediate the juxtaposed plates 42 through the standard 1 at any one or more of the fluid concentrating areas represented generally by the four quadrants of the generally rectangular fluid contacting face plate of the standard 1.

As illustrated in Figures 1, 3, 13, 14, 15 and 16, the rear standard 1 is provided with a forward fluid contacting face in the form of a face plate 45, and with the exception of the semiphere-like depressions present in the reverse face of plates 42, the outer or forward surface of plate 45 has the general configuration of the corresponding or reverse side of a plate 42, and is adapted to engage the gasketed, knobbed face of the obverse side of the adjacent plate 42. The plate 45 comprises, in substance, a flat plate-like element, supported along its rear surface by abutment with the supporting or reinforcing plate 46, which forms a portion of the front face of the rear standard 1. The face plate 45 is provided with the peripheral flange 47, directed toward and snugly telescoped over and welded to the outer complementary edge of the supporting plate 46 of the standard 1.

The substantially flat, central portion of the plate-like element 45 is surrounded by a six-sided ridge 48, embossed into the plate 45 to form a raised peripheral portion 49. The raised peripheral portion 49 extends from the ridge 48 to the flange 47. This raised portion 49 is particularly well adapted to engage the gaskets on the obverse face of the adjacent plate 42, to thereby establish the sealed flow space intermediate the plate 45 and the plate 42, as well as to establish the flow by-pass connection through any one or more of the flow ports 50 extending through the upright 1 and face plate 45. As clearly illustrated in Figures 14, 15 and 16 of the drawings, the raised portion 49 of the face plate or element 45 is provided with additional support in the form of backing strips 51 intermediate the raised portion 49 and the support or reinforcing plate 46 of the standard 1.

The upper portion of the rear standard 1, in addition to the face plate 45 and reinforcing plate 46 and flow ports 50, consists primarily of the vertically disposed U-shaped channel member 52, with the open side thereof facing forward, so that the ends of the relatively narrow but uniformly wide walls thereof engage the adjacent surface of the support or reinforcing plate 46, at either side of the vertical center line thereof. Similar U-shaped channel elements 53 and 54, with relatively narrow walls in the upper portions thereof and relatively wide walls in the lower portions thereof, are disposed on either side of the element 52, with the open sides of the upper portions thereof having the relatively narrow walls of each of the channel members 53 and 54 facing in opposed order the adjacent walls of the channel member 52, and with the ends of the walls of the channel members 53 and 54 welded to the adjacent wall of the channel element 52. The opposed and abutting edges of the relatively wide walls of the lower portions of the vertical channel members 53 and 54 are welded together. The face plate 46 is secured to this assembly of channel members 52, 53 and 54, as illustrated in Figure 14 of the drawings, by welding the vertical edges of the support plate 46 to the adjacent portions or walls of the assembled channels 53 and 54 opposite the channel 52.

The upper end of the standard 1 consists of an inverted U-shaped channel member 55, superimposed over the joined upper portion of the members 52, 53 and 54. The corner members 56, 57 and 58 are positioned above the rounded portion of the channel members 52, 53 and 54 and are welded to the adjacent surface of the member 55 and the adjacent surfaces of the members 52, 53 and 54, all as clearly illustrated in Figures 13 to 16, inclusive, of the drawings. It should be noted that the general curvature of the U-shaped channel members 52, 53 and 54, the cover member 55, and the corner members 56, 57 and 58 are all of the same general proportion, thereby to produce a symmetrical appearing, as well as a structurally sound, standard 1. A cross section of the lower portion of the standard 1, immediately above the base 2, is formed by the joined and opposed wide wall lower portion of the channels 53 and 54. The lower edge of the joined channels 53 and 54 rests upon and is joined to the U-shaped, inverted channel base element 2, as illustrated in Figure 24 of the drawings.

The lower end of the channel member 52 is also provided with a corner fillet 58, (see Figures 1 and 3), likeunto the top end thereof, and the inner and lower edges of the fillet 58 are welded to the adjacent joined walls of the channels 53 and 54.

The afore-described, welded arrangement of channel members, reinforcing plate and face plate provide a sturdy and rigid upright or standard and compression member 1.

As mentioned heretofore, the face plate 45 and the base plate 46 are generally rectangular in shape and of the approximate size of the plates 42. In each of the four corners or quadrants of the face plate 45, there is provided a flow port 59, stationed in the raised sections 49 of the face plate 45. By the stationing of the port 50 in the raised section 49 of the face plate 45, it is possible to use the gaskets commonly provided on the obverse face of the adjacent plate 42 to secure the desired fluid flow either intermediate the face plate 45 and the adjacent plate 42 or to by-pass the liquid through one or more of the flow passages 50 extending through the plate 45 and the standard 1.

To the edges of the plate 45, which define each of the ports 50 in the quadrants of the face plate 45, there is secured by any suitable means, such as by welding, the end of a pipe or conduit connection 59. The conduit 59 extends through suitable openings through the base plate 48 and adjacent portions of the channel members 53 and 54. Each of the pipe connections 59 is provided with a threaded ferrule 60 at its outer end, which extends beyond the elements of the standard 1. Fillet members 61 and 62 are provided on the outer portion of each of the pipes 59 at the points where they extend through the outer walls of the standard 1.

Suitable bearings 9 and 10 are provided in the vertical center portion of the standard 1 adjacent the upper and lower portions of the face plate 46 to receive the associated ends of the support rods 6 and 7. The associated ends of the rods 6 and 7 are provided with suitable shoulders for engaging complementary seat-like faces in the bearings 9 and 10, and with threaded ends which extend through the bearings 9 and 10 to receive the lock nut 63, whereby the rods 6 and 7 are securely locked to the rear standard 1. The bearings 9 and 10 are welded to the portion of the standard 1 along the outer contacting edges, as clearly illustrated in Figure 16 of the drawings.

As pointed out in the preceding comments, in addition to the plates 42, mounted upon the supporting rods 6 and 7, other movable elements, such as the terminal or spacing frames 64 and follower or compression blocks 80, are also supported upon the rods 6 and 7. As distinguished from the plates 42, which are supported primarily on the lower rod 6 and stabilized when in operative position by the upper rod 7, the terminal frames 64 and follower blocks 80 are supported primarily upon the upper rod 7 and are stabilized by the lower rod 6. The terminal or spacing frames 64 are illustrated in more detail in Figures 17, 18 and 20 of the drawings, and are generally rectangular in shape and approximately of the same size as the plates 42. The spacing elements or communication frames 64 are of a thickness sufficient to enable the inclusion therein of appropriate liquid connections 65, which extend outwardly through the side walls of the terminal frames 64, and communicate at their inner ends with the generally triangular-shaped flow passages 66, which pass transversely through the terminal frames and are positioned in the four quadrants of the terminal frames 64. The flow connections 65 are each so arranged in the lower half of the terminal frame, the inner ends thereof communicating with the lowermost portion of the passages 66 while in the upper half of the terminal frame the connection 65 communicates with the uppermost portions of the passages 66. The cross-section of each of the passages 66, taken laterally of the terminal frames 64, is generally the same as the corresponding cross-section of the flow passages through the plates 42. Each of the connections 65 is provided at its outer end with a suitably threaded ferrule 67, whereby to conveniently establish connection with a supply or discharge conduit.

The terminal or spacing elements 64 include a general skeleton structure, consisting of the side wall element or frame 68, which is formed into the general contour of the outer periphery of the terminal element 64, and is secured at the upper and lower ends to hanger blocks 69. Suitable reinforcing webs 70, as clearly illustrated in Figure 20 of the drawings, and which are formed of material having a depth equal to the depth of the outer frame element 68, extend at spaced intervals from side wall to side wall of the terminal elements 64, and are secured thereto as by welding at all points of contact therewith, as well as to the hanger block 69 at points of contact therewith. The web elements 70 also engage the face plates 71 and 74 to provide transverse support and withstand the pressure of the liquids in the adjacent flow spaces. As clearly illustrated in Figures 18 and 20 of the drawings, the outer wall element 68 of the spacing frame 64 is provided with suitable openings, through which fluid passages 65 extend into the interior of the terminal frames. The obverse and reverse faces of the terminal frames are formed of sheet metal suitably embossed to enable the establishment of contact with the corresponding faces of the adjacent plates 42, which are stationed in engagement with the terminal frame 64 when assembled in operative position onto the rods 6 and 7 of the supporting framework.

The reverse face 71 of the terminal frame 64 is clearly illustrated in Figure 20 of the drawings, and consists of the substantially flat face plate 71, into which has been embossed the hexagonal ridge 72, as clearly indicated in Figure 20 of the drawings, the upper and lower four walls of which extend diagonally across the face plate 71, and the two vertical walls of which extend parallel to the vertical axis of the plate 71, thereby to provide a continuous raised portion including all four corners of the plate 71 and raised portions along the vertical edges of the plate 71. Each of the raised corners of the plate 71 are ported and secured to a conduit 73 having a generally triangular-shaped cross-section, and which defines the walls of the passages 66. The outer edges of the face plate 71 of the terminal frame 64 are secured, as by welding, to the adjacent edges of the outer frame wall 68 and to the adjacent outer edges of the hanger blocks 69. The obverse face of the terminal frame 64 is provided with the face plate 74, which has substantially the same configuration as the knobbed surface of a plate 42, hereinafter to be described in more detail. The obverse face plate 74 of the terminal frame 64 is provided with apertures, corresponding to the flow passages 66, and the edges of these apertures are secured, as by welding, to the adjacent edges of the conduit 73, which define the flow passages 66. The outer periphery of the obverse face plate 74 is secured to the adjacent edge of the outer frame elements 68 and the associated edges of the hanger blocks 69 by any suitable means, such as welding.

Each of the terminal frames 64 is so constructed that it may be reversed end for end and mounted upon the rods 6 and 7 of the supporting framework with either end uppermost. The upper hanger block 69 is provided with a suitable caster support 75, which is secured to the hanger block 69 by any suitable means, such as by bolts 76. A caster 77 is provided in the caster support 75 and the face of the caster 77 has a configuration suitable for contact with the cylindrical surface of the upper support rod 7. By this arrangement, the terminal frame 64 is completely supported upon and vertically spaced from the rod 7. The engagement of the concave surface of the caster 77 with the convex surface of the rod 7 also affords lateral stabilization for the upper portion of the frame 64. Each of the hanger blocks 69 is provided with an outwardly opening slot 78 for receiving the support rods 6 and 7. The slots 78 extend into the hanger blocks 69 to a depth greater than that necessary to accommodate the rods 6 and 7, and are of a width slightly in excess of the diameter of the rods 6 and 7, whereby to secure a sliding contact with the adjacent side surfaces of the rods 6 and 7. By this expedient the lower portion of the terminal frame 64 is stabilized against lateral motion while the frame is mounted in operative position in the supporting framework.

As heretofore indicated, the obverse and reverse faces 74 and 71 of the terminal frame 64 are of such configuration as to be complementary to the faces of the adjacent plates 42 on either side of the element 64 when assembled in operative position in a plate heater of the improved design. When assembled in such an operative position, the raised portion of the reverse face 71 is engaged by the gaskets of the gasketed or obverse face of the adjacent plate 42, while the central portion of the reverse face 71, which is bounded by the ridge 72, is engaged by the knob-like flow distributing and stop elements on the obverse face of the adjacent plate 42. The obverse face 74, which is provided with suitable gasket grooves, gaskets and knob-like stops, engages the adjacent ungasketed or reverse face of the plate 42 adjacent thereto, in the same or substantially the same manner as one plate 42 engages another plate 42. As is common in the plate type of heat exchanger art, certain portions of the gaskets on the plates 42, as well as on the face 74 of the terminal frame 64, must be removed either prior to or after installation of the gasket on the plates, or separate gaskets must be used to secure thereby the appropriate type of flow through the flow passages formed between the adjacent plates, as well as between the plates and the terminal frame 64, the compression element 80 and the rear standard 1. By the appropriate use of gaskets on the mentioned elements, it is also possible to provide for the introduction of and the withdrawing of heat exchange medium through the flow connections of the rear standard 1, the terminal frames 64, and the follower block 80, as hereinafter to be further described.

As also clearly indicated in Figure 17 of the drawings, the spacing and connecting frames 64 are provided in the top thereof, immediately adjacent the left-hand side of the hanger block 69 when facing the obverse face 74, with a depression 79 to accommodate the auxiliary plate support rod 8. A similar depression 79 is located to the right of the hanger block 69 in the lower end of the terminal frame 64. The purpose of providing the additional depression 79 in the lower portion of the hanger block is to include in the terminal frame 64 the necessary provisions to enable the use of either end of the terminal frame for the mounting of the caster support 75.

Figure 23:
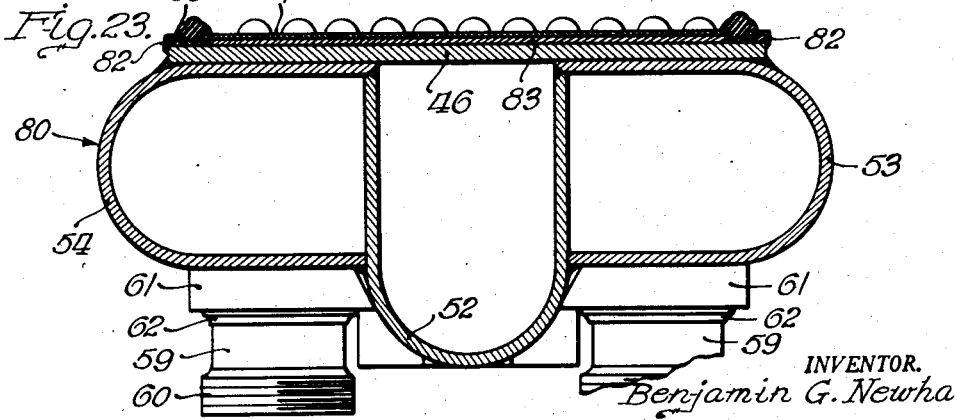
Figure 23 is a view taken along the line 23—23 of Figure 22 of the drawings.

The follower block or movable compression block or element 80 is, in substance, constructed like the upper portion of the rear standard 1 (see Figures 14 and 23). Likeunto the upper portion of the rear standard 1, the follower block or compression element 80 is provided with the U-shaped channel members 52, 53 and 54 and the reinforcing plate 46, all assembled with the same relation with respect to one another and in the same manner as the comparable elements of the rear standard 1. However, likeunto the terminal frame 64, the follower block 80 is provided with an obverse face 81 having, in substance, the same elements of construction, the same configuration, gasket grooves and knob-like surfaces as do the obverse faces of the plates 42 and the obverse face of the terminal frame 64. The obverse face 81 of the element 80 is provided with a peripheral flange 82, as illustrated in Figure 23 of the drawings. The flange 82 is welded to the adjacent edge of the reinforcing plate 46 of the element 80. The base of the gasket grooves of the plate 81 abut against the reinforcing plate 46. The main body portion of the plate 81, which is removed from the plate 46, is supported against transverse pressures by a support or backing plate 83. As distinguished from plates 42, the obverse face plate 81 of the follower block 80 is not provided with the triangular-shaped openings in the four corners thereof to constitute passages for liquid, but like unto the plate 45 of the rear standard 1, it is provided with circular openings to receive the associated ends of the conduits 59, which are sealed thereto as by welding. The conduits 59 extend through the structure of the follower block or compression element 80 in the same manner as heretofore described with respect to the comparable conduits 59 in the rear standard 1 and are provided at their outer ends with suitable, threaded ferrules 60.

The follower element 80, likeunto the standard 1, is provided with suitable ferrules 61 and 62 at the point at which the conduits 59 extend through the forward face of the block 80. As distinguished from the rear standard 1, but comparable to the terminal or separating frame 64, the compression element 80 is provided with a hanger block 84 in the central upper and central lower end portions thereof, as clearly indicated in Figure 21 of the drawings. The hanger blocks 84 are of a width comparable to the depth of the compression element 80. Two casters 85 (see Figures 19 and 21) are mounted in the upper hanger block 84. Casters 85 have a concave peripheral surface, suitable for engaging the convex surface of the upper support rod 7, upon which the terminal frame is movably supported and the upper portion thereof stabilized against lateral motion. A suitable cover element 86 to enclose the casters 85 is secured as by screws 87 to the upper portion of the upper hanger block 84. Each of the two hanger blocks 84 are provided with a large transverse opening extending the full depth of the hanger block. The opening is appreciably larger than the outer diameter of the support rods 6 and 7, whereby to avoid any contact between the hanger blocks 84 and the rods 6 and 7.

The follower or compression element 80, as used in Figure 21 of the drawings, is provided near its upper left-hand corner, immediately adjacent the hanger block 84, with a bushing 88, through which the auxiliary support rod 8 extends in sliding contact therewith. A similar bushing 88 is provided in the lower right-hand portion of the follower block 80, immediately adjacent the associated hanger block 84. The duplication of the hanger blocks 84 and the bushings 88 and the symmetrical arrangement of the remaining elements of the element 80 enable the end-for-end inversion thereof to add to the flexibility of the heat exchanger.

To seal the top and bottom portions of the compression element 80 at the upper and lower extremities of the channel elements 52, 53 and 54, there are provided the U-shaped channel members 89 of the same general proportion as the channel members 52, 53 and 54, and which are positioned with the open side of these channel elements 89 abutting against the ends of the wall sections of the channels 54 and 53. Corner fillet elements 90 are provided in each of the four corners to seal the space intermediate the outer ends of the channel elements 89 and the upper and lower ends of the curved portion of the channel elements 54 and 53. The inner ends of all four channel elements 89 are secured to the adjacent faces of the hanger blocks 84.

As previously mentioned, the obverse face plate 81 of the compression block 80 is constructed similarly to the obverse face plate 74 of the terminal or spacing frame 64, and is provided with gasket grooves and gaskets in the same fashion as are the obverse faces of the plates 42. Like unto the plates 42, the obverse plate 81 of the element 80 is also provided with spacing and flow distributing hollow, knob-like projections which abut against the reverse face of an adjacent plate. The plates 42 will be described hereinafter in more detail.

In the assembly of the follower block 80 upon the supporting framework, the weight of the follower or movable compression element 80 is supported upon the upper rod 7 by means of the casters 85, as clearly illustrated in Figures 19, 21 and 22 of the drawings. To prevent the possible lateral motion of the follower block 80 with respect to the support rods 6 and 7, the opposed projections 30 of the compression yoke 27 extend into the adjacent ends of the openings in the hanger blocks 84, intermediate the convex periphery of each of the rods 6 and 7 and the adjacent concave surface of the substantially circular opening, which extends through the inner portion of the hanger blocks 84. The projections 30 are of such a dimension as to be in sliding and bearing contact with the hanger blocks 84 and the rods 6 and 7.

The forward upright or standard 5 of the supporting framework, as illustrated in Figure 24 of the drawings, consists of a base 2 formed of a U-shaped channel element. Two supporting studs 3 are fixed to the base and a riser extends vertically from the base 2, formed of two opposed U-shaped channel members 91, having the edges of the abutting opposed walls welded together in the manner illustrated in Figure 25 of the drawings, and secured at the lower end thereof to the base 2. The upper extremity of the front standard 5 is closed in very much the same manner as the upper end of the rear standard 1 by the provision of the inverted U-shaped-like channel member 55 and the corner elements 56 and 57. As illustrated in Figure 1 of the drawings, the front standard is provided with suitable bearings 11 and 12 for receiving the rods 6 and 7, respectively, as well as the bearing 15 for receiving the auxiliary support rod 8.

The plates 42 consist of a relatively thin sheet metal stamping, generally rectangular in shape, and provided throughout the major, central portion thereof with staggered rows of hollow, knob-like or semispherical protuberances or stops, as illustrated in the United States Patent No. 2,281,754. The knobs in the various staggered rows of knobs are positioned eccentrically of the vertical center line of the plates 42. When the plates 42 are assembled in operative position, the knobs on the obverse face of one plate engage the reverse face of an adjacent plate intermediate the semispherical depression in the reverse face of the adjacent plate. By this arrangement the knobs limit the maximum compression of the gaskets on the obverse faces of the plates 42.

In the assembly of the plates 42, the terminal frames 64 and follower blocks 80 upon the rods 6, 7 and 8 of the supporting framework, and the arrangement of these elements in operative position, it is essential that a uniform pressure be applied both to the upper and lower ends of the compression blocks 80, so as to apply uniform pressure on all of the gasketed plates 42 intermediate the rear standard 1, the communication or spacing frames 64, and the compression block 80.

In the heretofore described variants of applicant's invention, the compressive thrust transfer elements 19 and yokes 27 have been stationed directly intermediate the compression applying hand wheels or grips 17 and the compression element 80. Obviously, such an arrangement requires the careful adjustment of the compression wheels 17 so as to secure the uniform application of pressure to both the top and bottom ends of the block 80. In the variant of applicant's invention illustrated in Figures 30, 31, and 32 of the drawings, applicant has provided a compression modulating spring means, whereby the improper application of compressive thrust by the minor misadjustments of the compression wheels 17 may be prevented.

By the variant of applicant's invention illustrated in Figures 30 to 32 of the drawings, applicant provides compression springs 102, enclosed within a cylindrically telescoped housing 103, intermediate the hub of the handwheel 17 and the thrust transfer sleeve 19. The telescoped housing 103 consists of two cylindrical, tubular elements 104 and 105, telescoped one into the other. A stud 106, secured on the element 104, operates in the slot 107 of the element 105, so as to lock the sections of the housing one to another to prevent relative rotation and limit axial motion. The ends of the housing 103 adjacent the handwheel 17 consists of a substantially cylindrical element 108 provided with a hub 109, which extends into the opening in the hub of the handwheel 17. The outer periphery of the hub 109 is provided with a channel to receive the retainer ring 21 supported within the opening of the hub of the wheel 17 by screws 22. The end of the cylindrical housing 103 for the springs 102 adjacent the thrust tube 19 consists of a substantially cylindrical compression plate 124, provided with an axially and outwardly extending, annular flange 110, into which is received the adjacent end of the thrust tube 19. Suitable set screws 111 extend inwardly through the flange 110 into engagement with the annular recess 23 in the forward end of the thrust tube 19, whereby the tube 19 is secured in operative position to the handwheel 17 through the housing 103 and the associated elements as afore-described, and may be retracted upon a decompression rotation of the wheel 17.

In the Figures 33 to 45, inclusive, of the drawings, there are illustrated several variations in the structure of the front and rear standards of the framework of the improved plate type apparatus, as well as variations in the structure of the follower block or compression element of the present invention.

Referring to Figures 1 and 33 of the drawings, it will be noted that the primary differences which distinguish the modification of the framework illustrated in Figure 33 of the drawings from that illustrated in Figure 1 of the drawings pertain to the reinforcing structural projection on the left-hand side of the rear standard and the right-hand side of the follower block. In other respects, the modification of the framework shown in Figure 33 of the drawings is, in substance, the same as that illustrated in Figure 1 of the drawings, and includes the left-hand or rear upright standard 1, which is provided with the base element 2, supported on stud-like feet 3. The front upright or right-hand standard 5 is also provided with a base 2 and supporting studs 3. The uprights 1 and 5 of Figure 33 of the drawings are joined by the parallel and horizontally disposed lower and upper primary and secondary support and stabilizing rods 6 and 7 and the stabilizing or auxiliary support rod 8. The manner in which the rods 6, 7 and 8 are associated with the standards 1 and 5, with the follower block 80, and the terminal frame 64 is the same as that illustrated in Figure 1 of the drawings. Similarly, the compression wheels 17 and the compression transmission elements 19 and 27 are the same as those shown in Figure 1 of the drawings.

The primary differences in the modified framework and the component elements thereof consist in the structural arrangement of the component elements which go to make up the rear standard 1, the front standard 5, and the follower block 80, as illustrated in Figures 34 to 39, inclusive, of the drawings. These figures pertain primarily to the rear or left-hand fixed standard of the framework, and illustrate the detailed aspects of the structural elements whereof the rear standard is formed. The modified rear standard 1, as illustrated in Figures 34 to 39, inclusive, of the drawings, is provided with a forward, fluid contacting face, or face plate 45, on the right-hand side of the standard, and, with the exception of the semi-circular depressions present in the reverse face of the plate-like elements 42, the outer or forward face of the plate 45 has the general configuration of the corresponding or reverse side of a plate 42. The major or body portion of the plate 45 is circumscribed by a ridge 48, defining the inner boundary of the raised peripheral portion 49 of the face plate, which peripheral portion 49 is adapted to engage the gasketed face of the obverse side of an adjacent plate-like element 42.

The face plate 45 of the rear standard 1 is, in substance, a flat plate-like element, generally rectangular in shape, and is supported along its rear surface by abutment with the supporting, reinforcing plate 46, which is secured to and forms a part of the standard 1. The raised peripheral portions 49 are supported against compression by the backing strip 51. The face plate 45 is provided with a rearwardly directed peripheral flange 47, snugly telescoped over and welded to the outer complementary edge of the reinforcing plate 46, upon which it is supported. The raised peripheral portion 49 extends from the ridge 48 to the flange 47 and, when in assembled position, is adapted to engage the gasket of the adjacent plate-like element 42 to establish a sealed, fluid flow space intermediate the liquid contacting plate 45 and the knobbed surface of the adjacent plate 42. Similarly, the raised portion or peripheral edge 49 is adapted to engage the gasket on adjacent plate 42 surrounding the apertures or flow ports 50 in the four quadrants of the plate 45 and similar apertures in plates 42, to thereby establish flow by-pass connections through one or more such ports 50.

The vertical standard 1, in addition to the face plate 45, and reinforcing plate 46, consists primarily of the vertically disposed riser formed of a structural member having a substantially flat, vertical body portion 125, having opposed, inwardly directed, curved, vertical edge portions 126, with the free edges spaced one from another. A substantially flat, vertically disposed, closure element 127 is interposed intermediate the opposed free edges of the curved, vertical edge portions 126 to thereby form a hollow, vertical riser, having a somewhat elliptical cross-section. A cap element 55 is provided as a closure for the upper portion of the standard. Cap element 55 comprises a substantially U-shaped channel member, and is supplemented by corner members 56 and 57 to complete the closure of the upper portion of the combined structural element 125 and closure element 127.

On the inner surface of the substantially flat body portion of the structural member 125, there is provided a backing plate 128, to which there are secured two transversely extending outer bracing elements 129. These are secured to plate 128 along at least a portion of their edges adjacent the backing plate 128 in any suitable manner, such as by welding. The outer bracing elements 129 extend transversely across the interior of the riser 1, and each strip 129 abuts against the inner surface of the closure element 127 and the adjacent edge of the inwardly directed, curved, vertical edge portions 126 of the structural member 125, and are joined to the closure element 127 and the vertical edge portions 126 at the line of juncture of these two elements in any suitable way, such as by welding. Two inner bracing elements 130 are spaced intermediate the outer bracing elements 129 and also extend transversely from the backing strip 128 to the closure element 127 and abut against these two elements, and are secured by any suitable means, such as by welding, to the inner face of the closure element 127. The bracing elements 129 and 130, together with the backing plate 128, and the reinforcing plate 46, constitute a rigid structure for absorbing compressive force applied transversely against the standard 1. As is clearly illustrated in Figure 37 of the drawings, the backing strip 46 is secured along its outer periphery to the front face of the standard 1, by any suitable means, such as by welding.

As clearly illustrated in Figures 34 and 36 of the drawings, the upper and lower ends 131 of the outer bracing elements 129 are bent inwardly a sufficient distance so as to abut against the adjacent lateral side of the adjacent inner bracing element 130, thereby adding appreciably to the structural reinforcement of the rear standard.

Similar to the arrangement shown in Figures 14, 15 and 16 of the drawings, the modified rear standard 1 of Figures 34 to 39, inclusive, of the drawings, is also provided with the conduits 59, the inner ends of which are secured by any suitable means, such as by welding, to the edge of the inner face plate 45, which defines the associated aperture 50, and extends through suitable openings in the backing strip 51, the reinforcing plate 46, the closure element 127, the backing plate 128, and the structural member 125, and is provided with conventional coupling element 60 at the end thereof, which extends beyond the rear face of the standard 1. Conduit 59 is suitably secured to the structural member 125 by welding, as, for example, by the use of the ferrule 62 joined to the pipe 59 by the welding 132 and joined to the outer face of the structural element 125 by the welding 133. In this manner, the conduit 59 is rigidly supported on the structural elements of the rear standard 1.

Similar to the arrangement shown in Figures 14, 15 and 16, rear standard 1 is provided with suitable bearing-like elements 9 and 10 to receive the support rods 6 and 7. Bearings 9 and 10 extend through suitable apertures or edge openings in the face plate 45, the supporting strip 51, reinforcing plate 46, and closure element 127, and the structural member 125.

The modified follower block or compression block element, shown in Figures 40 to 43, inclusive, of the drawings, differs primarily from the follower block shown in Figures 19, 21, 22 and 23 of the drawings by the deletion of the channel member or brace 52 which extends from the forward face which is the reverse face of the aforedescribed compression element 80, and the substitution therefor of inner structural reinforcements comparable to those described with respect to the modified form of rear standard shown in Figures 34 to 39, inclusive, of the drawings. The modified form of compression element 80 is provided with a structural member or body portion 125, consisting of a substantially flat body plate, having opposed, inwardly directed, curved, vertical edge portions 126. The structural member 125 of the compression element 80, as shown in Figure 43 of the drawings, is provided intermediate the free, inwardly directed, major edges of the curved edge portions 126 with a closure element 127, thereby forming, in substance, a hollow compression element, having a somewhat elliptical-like cross-section. The compression element 80, as shown in Figures 40 to 42, inclusive, of the drawings, is provided with upper and lower cap elements 89, supplemented by curved corner pieces 90 to complete the closure of the upper and lower extremities of the compression block 80.

The compression element 80 is provided with an obverse face 81, having, in substance, the same elements of construction and the same configuration, gasket grooves, knobbed-like or spacing element surface as is found in the plates 42. The obverse face 81 of the compression element 80, which is a liquid contacting surface, is provided with a peripheral flange 82, as illustrated in Figure 43 of the drawings. Flange 82 is telescoped over and welded to the complementary outer edge of the reinforcing plate 46. As in the modified form of rear standard 1, plate 46 is secured, as by welding, to the structural element 125 and abuts against the closure member 127, which is overlapped by the reinforcing plate 46 in the manner shown in Figure 43 of the drawings. The plate 81 is provided with a gasket groove and a gasket for engaging the reverse face of an adjacent plate 42 when the device is assembled in operative position. To suitably support the plate 81 against compression upon the reinforcing plate 46, there is provided a backing plate 83.

On the interior of the compression element 80, like unto the modified rear standard 1 of Figures 34 to 39, inclusive, of the drawings, there is provided the backing plate 128, which abuts against the flat plate portion of the structural member 125. Intermediate the backing plate 128 there are also provided the outer bracing elements 129 with their inwardly directed upper and lower extremities 131 and the inner bracing means or elements 130, all of which are similarly arranged with respect to one another and secured to the associated backing plate 128 and the closure element 127 in the same manner as comparable elements are associated and secured to the comparable backing plate 128 and closure element 127 of the modified form of rear standard 1, illustrated in Figures 34 to 39, inclusive, of the drawings.

Like unto the modified form of rear standard 1, the compression element 80 is also provided with the transversely extending conduits 59 in each quadrant of the compression element 80 which extend through suitable openings in the structural member 125, the backing plate 128, the closure member 127, the reinforcing plate 46, the backing strip 83, and are secured at their obverse or inner ends to the edges of the plate 81, which defines the apertures 50. The reverse or outer ends of the conduits 59 are provided with conventional coupling members 60.

Like unto the compression element illustrated in Figure 22 of the drawings, the modified form of compression element is similarly provided with supporting yoke or bracket members 84, suitably secured to the structural elements 125, 127 and the caps 89. The upper bracket 84 of the compression element is provided with casters 85 for supporting the compression element upon the support rod 7. To enclose the casters 85, a closure cover 86 is secured to the upper portion of the bracket 84. The modified compression element 80 is also provided with suitable passage through the structural members 125, 127, 128, 46, 83 and 81, through which the stabilizing and auxiliary support rod 8 may extend.

As clearly illustrated by the drawings in Figures 40 to 42, inclusive the modified compression element is so constructed that it may be inverted end for end, it being necessary only to shift the casters 85 to enable the use of the thus inverted compression element 80 in the plate type apparatus.

In the Figures 44 and 45 of the drawings, there is shown a modified form of front standard 5. Similar to the modified rear standard 1 of Figures 34 to 39, inclusive, of the drawings, the modified front standard 5 of Figures 44 and 45 is provided with the same base 2 and the same structural body portion member 125 and closure element 127. Also similar to the modified form of rear standard 1, the closure element 127 is interposed intermediate the free edge of the inwardly curved edge portions 126 of the structural member 125. In the modified form of front standard 5, as clearly illustrated in Figures 44 and 45 of the drawings, the hollow front standard, having a substantially elliptical cross-section, is provided with vertically extending inner braces 134, which extend, in each instance, transversely across the interior of the front standard 5 from the line of juncture intermediate the edge of the curved end portion 126 and the closure element 127. The bracing elements 134 extend throughout the entire height of the front standard 5 from the base 2 to the cap portion 55 thereof and are secured, as by welding, to the inner surface of the flat portion of the structural member 125 and to the inner surface of the adjacent portions of the closure member 127 and the curved end portions 126. By the use of the bracing elements 134 in the modified form of front standard, an appreciably increased rigidity is secured in the front standard.

Similar to the front standard illustrated in Figures 24, 25 and 26 of the drawings, the modified form of front standard of Figures 44 and 45 of the drawings is provided with the bearing elements 11 and 12 for the support rods 6 and 7 and the bearing anchorage 15 for the stabilizing and auxiliary support rod 8.

From the foregoing description of the applicant's invention, it is apparent that the applicant has provided an improved plate type apparatus or the like, in which an assemblage of elements is carried on a support and embodies novel and unique features of supporting some of the movable portions of the apparatus on one portion of the framework or support, while supporting the remaining movable elements of the apparatus on a separate portion of the framework or support, by virtue of which expedient it is possible to maintain accurate alignment between the associated elements of the assemblage.

Applicant has also provided a novel framework or structure in which the rigid structural elements, such as standards and compression elements, may be fabricated from sheet metal and structural members. In the applicant's improved type of heat exchanger, certain portions of the standards and compression elements are also used to provide sealing or closure walls for the liquid flow spaces.

The applicant's invention also provides a unique design in symmetrical arrangement of the gasket upon a plate type heat exchanger, in which, by slight modification of the gaskets, such as the removal of certain portions thereof, great flexibility is possible in the arrangement of the various plates upon the supports to secure numerous variations in the arrangement of the liquid flow system.

Applicant's invention also provides certain unique features in the design of the plate, such as the configuration of the apertures in the plate and the associated gaskets, whereby the maximum area of the plate is made available for heat transfer. The novel gasket contemplated by applicant's invention also provides an appreciable improvement in the type of gaskets commonly used in the plate type heat exchanger, filter presses, and the like.

It will be appreciated by those skilled in the art that in a device embodying the present invention, various changes may be made in the elements thereof without departing from the scope of the invention. Accordingly, it is desired that this invention should not be limited to the specifically illustrated arrangement as contained in the drawings, and as hereinbefore particularly described, excepting insofar as necessary by the prior art disclosures and by the appended claims.

The invention is claimed as follows:

1. In a standard for an apparatus, a base comprising a channel member having the open side thereof directed downwardly, a vertical riser secured to the upper surface of said base, said vertical riser comprising two vertical channel members each of a breadth equal to the breadth of said base and with the walls of the lower portions thereof being relatively wide and the walls of the upper portions thereof being relatively narrow, the edges of said relatively wider lower wall portions being in abutment and secured together, a fourth channel member of a breadth equal to the spacing between the relatively narrow upper wall portions of said vertical channel members and of a length equal to the length of said relatively narrow upper wall portions positioned intermediate the opposed narrow upper wall portions, the edges of said fourth channel member being flush with two opposed edges of said vertical channel members and secured thereto, and a reinforcing plate superimposed over the open side of the fourth channel member and the adjacent narrow wall portions of said vertical channel members, and a liquid contacting face plate superimposed over the vertical face of said reinforcing plate with the edges thereof secured to the edges of said reinforcing plate, apertures in the four quadrants of said liquid contacting face plate and aligned apertures in said reinforcing plate and said vertical riser, conduit means sealed to the edges of said face plate defining the apertures in said four quadrants thereof and extending through said reinforcing plate and said vertical riser and secured thereto for support thereon, said liquid contacting face plate being provided with an offset portion to produce a raised peripheral edge, and support means intermediate said raised peripheral edge and said reinforcing plate.

2. In a spacing element for a plate type of apparatus, a rigid generally rectangular outer frame formed of relatively thick sheet metal and having the general rectangular dimensions of a plate for a plate type apparatus in which the spacing element is to be used, webbing elements extending from side to side of said frame and having the ends thereof welded to the adjacent surfaces of said outer frame, a relatively thin plate-like element positioned on the obverse side of said frame and attached thereto and having the edges thereof welded to the outer adjacent edges of said frame, said plate-like element being provided with staggered rows of knobbed-like surfaces and a continuous recess for receiving outwardly projecting gasket means, a relatively thin plate-like element on the reverse side of said frame and attached thereto and of a configuration complementary to the adjacent face of a plate-like element of said plate type apparatus, passageways extending from side to side of said spacing element in each of the four quadrants thereof and extending through said relatively thin plate-like elements and secured at their ends to corresponding apertures in said relatively thin plate-like elements, conduit means extending laterally through said outer frame and joining said passageways intermediate said opposed relatively thin plate-like elements, said conduit means which join said passageways in the two lower quadrants of said spacing element being joined therewith at the lowest point of said passageways and said conduits which join the passageways in the two upper quadrants of said spacing element being joined therewith at the uppermost portions of said last mentioned passageways.

3. A spacing element for a plate type heat exchanger in which an assemblage of parts is movably carried upon a support, comprising a substantially rectangular frame provided with two opposed and relatively thin and substantially parallel and substantially flat walls supported by said frame, the wall on the reverse side of said frame having a slightly depressed central portion and a raised peripheral portion, the obverse wall of said frame being provided with gasket means and having a continuous recess surrounding its central portion for receiving said gasket means, aligned and opposed apertures in each of the quadrants of said walls, the apertures in the obverse wall being surrounded by said continuous recess and the apertures in the reverse wall being in the raised peripheral portion thereof, passage means intermediate said walls with the ends of each passage sealed to the adjacent edges of said walls defining a set of opposed apertures, conduit means communicating with such passage means and extending laterally outwardly through said frame, parallel branch recesses inwardly of each of the apertures in the obverse wall, said parallel branch recesses all being disposed of obliquely to the principal axis of the obverse wall and symmetrically with respect to the major and minor axis of said obverse wall and joined at their opposite ends to said continuous recess, the branch recesses inwardly of an aperture in said obverse wall being parallel to the corresponding branch recesses inwardly of the diagonally opposite aperture in said obverse wall, outwardly projecting gasket means in portions of said continuous recess and branch recesses whereby to surround a portion of said obverse wall including the central portion thereof and two diagonally opposite apertures, independent gasket means surrounding the remaining two apertures in said obverse wall and positioned in the portions of the recesses formed by the continuous gasket groove and associated branch grooves surrounding said apertures, said obverse face being provided with stop means adapted to engage an adjacent element in an assembled plate type heat exchanger, whereby to limit the compression of said gasket means.

4. A spacing element for a plate type heat exchanger in which an assemblage of parts is movably carried upon a support, comprising a substantially rectangular frame provided with two opposed and relatively thin and substantially parallel and substantially flat walls supported by said frame, the wall on the reverse side of said frame having a slightly depressed central portion and a raised peripheral portion, the obverse wall of said frame being provided with gasket means and having a continuous recess surrounding its central portion for receiving said gasket means, aligned and opposed apertures in each of the quadrants of said walls, the apertures in the obverse wall being surrounded by said continuous recess and the apertures in the reverse wall being in the raised peripheral portion thereof, passage means intermediate said walls with the ends of each passage sealed to the adjacent edges of said walls defining a set of opposed apertures, conduit means communicating with such passage means and extending laterally outwardly through said frame, parallel branch recesses inwardly of each of the apertures in the obverse wall, said parallel branch recesses all being disposed obliquely to the principal axis of the obverse wall and symmetrically with respect to the major and minor axis of said obverse wall and joined at their opposite ends to said continuous recess, the branch recesses inwardly of an aperture in said wall being parallel to the corresponding branch recesses inwardly of the diagonally opposite aperture in said obverse wall, an outwardly projecting gasket means in portions of said continuous recess and branch recesses whereby to surround a portion of said obverse wall including the central portion thereof and two diagonally opposite apertures, independent gasket means surrounding the remaining two apertures in said obverse wall and positioned in the portions of the recesses formed by the continuous gasket groove and associated branch grooves surrounding said apertures, said obverse face being provided with stop means adapted to engage an adjacent element in an assembled plate type heat exchanger, whereby to limit the compression of said gasket means, said gasket means in said grooves being provided with laterally projecting spurs extending into the portions of the continuous recess and branch recess along the edges of the gasket means which are devoid of engagement with adjacent wall of a recess, a slotted hanger element secured to the upper and lower portion of said frame, and caster means carried by said upper hanger element to carry said spacing element upon said support for said assemblage.

5. A compression element for use in a plate type of heat exchanger, comprising opposed vertical channel members with the open sides thereof oppositely spaced one from another, a third channel member of a width equal to the spacing between said opposed channel members and of a length equal to the length of said vertical channel members and positioned intermediate said opposed channel members with the edges of the walls of said third channel member being flush with two opposed edges of said vertical channel members, a reinforcing plate superimposed over the open side of said third channel member and the adjacent wall portions of said vertical channel members, a relatively thin sheet metal liquid contacting face plate superimposed over said reinforcing plate with the edges of the face plate joined to the edges of said reinforcing plate, stop means on said face plate whereby to engage an adjacent assembly of elements and to maintain said face plate in spaced relation from the adjacent elements in said assemblage, apertures in each quadrant of said face plate, aligned apertures in said reinforcing plate and said vertical channel members, conduit means extending through said aligned apertures in said vertical channel members and said reinforcing plate and secured in liquid tight connections to the edges of the face plate defining said apertures.

6. A compression element for use in a plate type of heat exchanger in which an assemblage of elements is carried by a support, comprising opposed vertical channel members with the open sides thereof oppositely spaced one from another, a third channel member of a width equal to the spacing between said opposed channel members and of a length equal to the length of said vertical channel members and positioned intermediate said opposed channel members with the edges of the walls of said third channel member being flush with two opposed edges of said vertical channel members, a reinforcing plate superimposed over the open side of said third channel member and the adjacent wall portions of said vertical channel members, a relatively thin sheet metal liquid contacting face plate superimposed over said reinforcing plate with the edges of said face plate joined to the edges of said reinforcing plate, stop means on said face plate whereby to engage an adjacent assembly of elements and to maintain said face plate in spaced relation from the adjacent elements in said assemblage, apertures in each quadrant of said face plate, aligned apertures in said reinforcing plate and said vertical channel members, conduit means extending through said aligned apertures in said vertical channel members and said reinforcing plate and secured in liquid tight connections to the edges of the face plate defining said apertures, a continuous recess in the obverse face of said face plate surrounding said apertures, branch recesses joined at each of their ends to said continuous recess and positioned inwardly of said apertures and symmetrically arranged with respect to the main axis of said face plate, and outwardly extending gasket means in certain portions of said continuous recess and branch recesses, hanger elements secured to said vertical channel members at the upper and lower extremities of said vertical channel members and positioned at the transverse central portion of such extremities, closure means for said upper and lower extremities, and caster means associated with said upper hanger element for carrying said compression element upon a support for an assemblage of elements.

7. In a standard for an apparatus, a base comprising a channel member having the open side directed downwardly, a substantially vertical riser secured to the upper surface of the base and comprising a structural member having a substantially flat body portion and two opposed inwardly directed curved vertical edge portions and a closure element secured along its vertical edges to the free opposed vertical edges of the structural member, and a cap element secured to the upper edges of the structural member and closure element, said standard being provided with a backing plate abutting against the inner surface of the structural member intermediate the curved vertical edge portions, outer bracing elements extending transversely to the vertical riser and abutting against the inner face of said backing plate and the inner face of said closure element and the inner face of said curved vertical edge portions, and inner bracing means intermediate said outer bracing elements and abutting against the opposed faces of said bracing plate and said closure element, said inner bracing means being secured to the inner surface of said closure element and said outer bracing element being secured to the inner surface of said backing plate and secured to the inner surface of said closure element and the inner surface of the opposed inwardly directed curved edge portions of the structural member at the line of juncture between the closure element and said curved edge portions.

8. In a standard for an apparatus, a base comprising a channel member having the open side directed downwardly, a substantially vertical riser secured to the upper surface of the base and comprising a structural member having a substantially flat body portion and two opposed inwardly directed curved vertical edge portions and a closure element secured along its vertical edges to the free opposed vertical edges of the structural member, and a cap element secured to the upper edges of the structural member and closure element, said standard being provided with a backing plate abutting against the inner surface of the structural member intermediate the curved vertical edge portions, outer bracing elements extending transversely to the vertical riser and abutting against the inner face of said backing plate and the inner face of said closure element and the inner face of said curved vertical edge portions, and inner bracing means intermediate said outer bracing elements and abutting against the opposed faces of said bracing plate and said closure element, said inner bracing means being secured to the inner surface of said closure element and said outer bracing elements being secured to the inner surface of said backing plate and secured to the inner surface of said closure element and the inner surface of the opposed inwardly directed curved edge portions of the structural member at the line of juncture between the closure element and said curved edge portions, the upper and lower ends of the outer bracing elements being directed inwardly a sufficient distance to abut against an adjacent surface of said inner bracing means, a reinforcing plate superimposed over a portion of the outer surface of said closure element and a portion of the adjacent surface of said curved vertical edge portions, a substantially rectangular liquid contacting face plate superimposed over the vertical face of said reinforcing plate with the edges thereof secured to the edges of said reinforcing plate, apertures in the four quadrants of said face plate and aligned apertures in said reinforcing plate and said closure element and said backing plate and said structural member, conduit means sealed to the edges of said face plate defining the apertures in said four quadrants thereof and extending through said reinforcing plate and closure element and structural member, said conduit means being secured to said structural member for support thereon, said liquid contacting face plate being provided with offset portions to provide a raised peripheral portion, and compression support means intermediate said raised peripheral portion and said reinforcing plate.

9. In a compression element for use in a plate type device, a structural member having a substantially flat body portion and two opposed inwardly directed curved side edge portions, a closure element secured along its major edges to the opposed major edges of the structural member, and cap elements secured to each of the ends of the combined structural member and closure element, a backing plate abutting against the inner surface of the structural member intermediate the curved vertical edge portions, outer bracing elements extending transversely to the vertical riser and abutting against the inner face of said backing plate and the inner face of said closure element and the inner face of said curved vertical edge portions, and an inner bracing means intermediate said outer bracing elements and abutting against the opposed faces of said backing plate and said closure element, said inner bracing means being secured to the inner surface of said closure element and said outer bracing elements being secured to the inner surface of said backing plate secured to the inner surface of said closure element and the inner surface of the opposed inwardly directed curved edge portions of the structural member at the lines of juncture between the closure element and said curved edge portions.

10. In a standard for an apparatus, a base comprising a channel member having the open side directed downwardly, a substantially vertical riser secured to the upper surface of the base and comprising a structural member having a substantially flat body portion and two opposed inwardly directed curved vertical edge portions and a closure element secured along its vertical edges to the free opposed vertical edges of the structural member, and a cap element secured to the upper edges of the structural member and closure element, said standard being provided with a backing plate abutting against the inner surface of the structural member intermediate the curved vertical edge portions, outer bracing elements extending transversely to the vertical riser and abutting against the inner face of said backing plate and the inner face of said closure element and the inner face of said curved vertical edge portions, and inner bracing means intermediate said outer bracing elements and abutting against the opposed faces of said bracing plate and said closure element, said inner bracing means being secured to the inner surface of said closure element and said outer bracing elements being secured to the inner surface of said backing plate and secured to the inner surface of said closure element and the inner surface of the opposed inwardly directed curved edge portions of the structural member at the line of juncture between the closure element and said curved edge portions, the upper and lower ends of the outer bracing element being directed inwardly a sufficient distance to abut against the adjacent surface of said inner bracing means, a reinforcing plate superimposed over the outer surface of said closure element and a portion of the adjacent surface of said curved vertical edge portions, a substantially rectangular liquid contacting face plate superimposed over the outer face of said reinforcing plate with the edges thereof secured to the edges of said reinforcing plate, apertures in the four quadrants of said face plate and aligned apertures in said reinforcing plate and said closure element and said backing plate and said structural member, and conduit means sealed to the edges of said face plate defining the apertures in said four quadrants thereof and extending through said reinforced plate and closure element and structural member, said conduit means being secured to said structural member for support thereon.

11. In a standard for an apparatus, a base comprising a channel member having the open side directed downwardly, a substantially vertical riser secured to the upper surface of the base and comprising a structural member having a substantially flat body portion and two opposed inwardly directed curved vertical edge portions and a closure element secured along its vertical edges to the free opposed vertical edges of the structural member, and a cap element secured to the upper edges of the structural member and closure element, said standard being provided with a backing plate abutting against the inner surface of the structural member intermediate the curved vertical edge portions, outer bracing elements extending transversely to the vertical riser and abutting against the inner face of said closure element and the inner face of said curved vertical edge portions, and inner bracing means intermediate said outer bracing elements and abutting against the opposed faces of said bracing plate and said closure element, said inner bracing means being secured to the inner surface of said closure element and said outer bracing elements being secured to the inner surface of said backing plate and secured to the inner surface of said closure element and the inner surface of the opposed inwardly directed curved edge portions of the structural member at the line of juncture between the closure element and said curved edge portions, the upper and lower ends of the outer bracing elements being directed inwardly a sufficient distance to abut against the adjacent surface of said inner bracing means, a reinforcing plate superimposed over the outer surface of said closure element and a portion of the adjacent surface of said curved vertical edge portions, a substantially rectangular liquid contacting face plate superimposed over the outer face of said reinforcing plate with the edges thereof secured to the edges of said reinforcing plate, apertures in the four quadrants of said face plate and aligned apertures in said reinforcing plate and said closure element and said backing plate and said structural member, and conduit means sealed to the edges of said face plate defining the apertures in said four quadrants thereof and extending through said reinforced plate and closure element and structural member, said conduit means being secured to said structural member for support thereon, the liquid contacting face plate being provided with offset portions to provide a raised peripheral portion, a compression support means intermediate said raised peripheral portion and said reinforcing plate, and stop means on the face plate whereby to engage an adjacent assembly of elements and to maintain said face plate in spaced relation from the adjacent elements in said assemblage.

12. In a standard for an apparatus, a base comprising a channel member having the open side directed downwardly, a substantially vertical riser secured to the upper surface of the base and comprising a structural member having a substantially flat body portion and two opposed inwardly directed curved vertical edge portions and a closure element secured along its vertical edges to the free opposed vertical edges of the structural member, and a cap element secured to the upper edges of the structural member and closure element, said standard being provided with a backing plate abutting against the inner surface of the structural member intermediate the curved vertical edge portions, outer bracing elements extending transversely to the vertical riser and abutting against the inner face of said backing plate and the inner face of said closure element and the inner face of said curved vertical edge portions, and inner bracing means intermediate said outer bracing elements and abutting against the opposed faces of said bracing plate and said closure element, said inner bracing means being secured to the inner surface of said closure element and said outer bracing elements being secured to the inner surface of said backing plate and secured to the inner surface of said closure element and the inner surface of the opposed inwardly directed curved edge portions of the structural member at the line of juncture between the closure element and said curved edge portions, the upper and lower ends of the outer bracing elements being directed inwardly a sufficient distance to abut against the adjacent surface of said inner bracing means, a reinforcing plate superimposed over the outer surface of said closure element and a portion of the adjacent surface of said curved vertical edge portions, a substantially rectangular liquid contacting face plate superimposed over the outer face of said reinforcing plate with the edges thereof secured to the edges of said reinforcing plate, apertures in the four quadrants of said face plate and aligned apertures in said reinforcing plate and said closure element and said backing plate and said structural member, and conduit means sealed to the edges of said face plate defining the apertures in said four quadrants thereof and extending through said reinforced plate and closure element and structural member, said conduit means being secured to said structural member for support thereon, the liquid contacting face plate being provided with offset portions to provide a raised peripheral portion, a compression support means intermediate said raised peripheral portion and said reinforcing plate, and stop means on the face plate whereby to engage an adjacent assembly of elements and to maintain said face plate in spaced relation from the adjacent elements in said assemblage, there being provided a continuous recess in the obverse face of said face plate surrounding the apertures in said face plate, branch recesses joined at each of their ends to said continuous recess and positioned inwardly of said apertures and symmetrically arranged with respect to the main axis of said face plate, outwardly extending gasket means in certain portions of said continuous recesses and branch recesses, a hanger element secured to said structural member and closure element at the end thereof and positioned midway between the sides of the combined structural member and closure element, and caster means associated with said hanger element for carrying said compression element upon a support for an assemblage of elements.

13. In a device of the class described the combination of a frame having a fixed vertically disposed end wall upon one side of which is provided a compression face having a top margin, a bottom margin, and spaced sides extending therebetween, an upper support member adjacent the top margin of said compression face, substantially centered between the respective sides thereof, and projecting substantially perpendicularly therefrom, a lower support member adjacent the bottom margin of said compression face, substantially centered between the respective sides thereof, and projecting therefrom in substantially parallel relation with respect to said upper support member, a movable wall member having roller means whereby said movable wall member is slidably suspended from said upper support member and having a compression face corresponding to the compression face of said vertically disposed end wall and facing theretoward, said movable wall member having a lower notch adapted to straddle said lower support member whereby said movable wall member is stabilized against lateral displacement, a plurality of plate-like element substantially corresponding with the compression faces of the end wall and the movable wall member, respectively, and interposed therebetween, each of said plate-like elements being provided with an upper peripheral notch and a lower peripheral notch, said upper and lower notches being engaged in straddling relation with the respective upper and lower support members with clearance, said plate-like elements being supported on the lower support member and stabilized against lateral displacement by said upper support member, and pressure exerting means engageable with a portion of said frame and adapted selectively to bear against said movable wall member and exert pressure thereagainst toward said fixed end wall to engage said plate-like elements therebetween.

BENJAMIN G. NEWHALL.

References Cited in the file of this patent

UNITED STATES PATENTS

| Number | Name | Date |
|---|---|---|
| 1,245,002 | Mastin | Oct. 30, 1917 |
| 1,664,106 | Fisher | Mar. 27, 1928 |
| 1,770,254 | Seligman | July 8, 1930 |
| 1,958,834 | Moore | May 15, 1934 |
| 1,972,379 | Feldmeir | Sept. 4, 1934 |
| 1,986,140 | Dapp | Jan. 1, 1935 |
| 2,015,819 | Seligman et al. | Oct. 1, 1935 |
| 2,028,562 | Prestige | Jan. 21, 1936 |
| 2,039,216 | Feldmeir | Apr. 28, 1936 |
| 2,186,501 | Seligman et al. | Jan. 9, 1940 |
| 2,217,567 | Seligman et al. | Oct. 8, 1940 |
| 2,252,916 | Crosby | Aug. 19, 1941 |
| 2,256,904 | Kintner | Sept. 23, 1941 |
| 2,281,754 | Dalzell | May 5, 1942 |
| 2,302,550 | Hoyle | Nov. 17, 1942 |
| 2,307,440 | Wilson | Jan. 5, 1943 |
| 2,314,966 | Astle | Mar. 30, 1943 |

FOREIGN PATENTS

| Number | Country | Date |
|---|---|---|
| 396,696 | Great Britain | July 31, 1933 |
| 424,502 | Great Britain | Feb. 22, 1935 |
| 513,589 | Great Britain | Oct. 17, 1939 |
| 582,879 | Great Britain | Nov. 29, 1946 |